(12) United States Patent
Lynch et al.

(10) Patent No.: US 12,119,691 B1
(45) Date of Patent: Oct. 15, 2024

(54) CHARGER SYSTEM FOR PORTABLE ELECTRONIC DEVICES

(71) Applicant: Pioneer Square Brands, Inc., High Point, NC (US)

(72) Inventors: Riley Edwin Lynch, Greensboro, NC (US); Quentin Wade Forbes, Winston Salem, NC (US); William Miles Haskins, Kernersville, NC (US)

(73) Assignee: Pioneer Square Brands, Inc., High Point, NC (US)

( * ) Notice: Subject to any disclaimer, the term of this patent is extended or adjusted under 35 U.S.C. 154(b) by 0 days.

(21) Appl. No.: 18/668,136

(22) Filed: May 18, 2024

(51) Int. Cl.
| | |
|---|---|
| *H02J 7/00* | (2006.01) |
| *A45C 11/00* | (2006.01) |
| *H01R 13/24* | (2006.01) |
| *H01R 31/06* | (2006.01) |

(52) U.S. Cl.
CPC ............ *H02J 7/0044* (2013.01); *A45C 11/00* (2013.01); *H01R 13/2471* (2013.01); *H01R 31/06* (2013.01); *H02J 7/0013* (2013.01); *A45C 2011/002* (2013.01); *A45C 2011/003* (2013.01); *H02J 2207/30* (2020.01)

(58) Field of Classification Search
CPC .... H02J 7/0044; H02J 7/0013; H02J 2207/30; A45C 11/00; A45C 2011/002; A45C 2011/003; H01R 13/2471; H01R 31/06
USPC .......................................................... 320/115
See application file for complete search history.

(56) References Cited

U.S. PATENT DOCUMENTS

| | | | | |
|---|---|---|---|---|
| 5,686,811 A | * | 11/1997 | Bushong ............... | H02J 7/0045 429/96 |
| 7,738,247 B2 | * | 6/2010 | Choi ..................... | H02J 7/0044 361/679.43 |
| 7,859,220 B2 | * | 12/2010 | Bushong ........... | H02J 7/007192 429/100 |
| 8,844,817 B2 | * | 9/2014 | Glanzer ............. | G06K 7/10009 235/375 |
| 9,172,267 B2 | * | 10/2015 | Faranda .................. | H02J 7/342 |
| 9,385,549 B2 | * | 7/2016 | Miller ................... | H02J 7/0042 |
| 9,595,840 B2 | * | 3/2017 | Miller ................... | H02J 7/0042 |
| 10,056,766 B2 | * | 8/2018 | Smeja ................... | H02J 7/0013 |
| 10,538,166 B2 | * | 1/2020 | Ito .......................... | B60L 53/51 |
| 10,547,188 B2 | * | 1/2020 | Byrne ..................... | H01R 13/73 |
| 10,666,309 B2 | * | 5/2020 | Carnevali .............. | H01R 31/06 |
| 10,700,483 B1 | * | 6/2020 | Piper ...................... | G06F 1/1632 |
| 10,770,853 B1 | * | 9/2020 | Piper ...................... | H01R 31/06 |
| 10,884,074 B2 | * | 1/2021 | Robison ................ | H02J 7/0045 |
| 11,005,279 B2 | * | 5/2021 | Miller ................... | H02J 7/0042 |

(Continued)

FOREIGN PATENT DOCUMENTS

| | | | | | |
|---|---|---|---|---|---|
| GB | 2535139 A | * | 8/2016 | .......... | G06F 1/1632 |
| TW | M607150 U | * | 2/2021 | ............... | H02J 7/02 |

*Primary Examiner* — M Baye Diao
(74) *Attorney, Agent, or Firm* — Grandview Law

(57) ABSTRACT

A portable electronic device charger system includes (I) a portable electronic device charger assembly including (A) at least one device bay including (i) a floor including an electrical interface; (ii) a first wall extending perpendicularly from the floor; (II) a portable electronic device case assembly; and (III) an electrical power coupler removably electrically couplable to the interface, and removably couplable to the first wall, and removably couplable to the portable electronic device case assembly. Other aspects are described in the claims, drawings, and text forming a part of the present disclosure.

8 Claims, 39 Drawing Sheets

(56) References Cited

U.S. PATENT DOCUMENTS

| | | | |
|---|---|---|---|
| 11,540,602 B2 * | 1/2023 | Okada | A45C 11/00 |
| 11,669,128 B1 * | 6/2023 | Troedson | G06F 1/1632 |
| | | | 361/679.41 |
| 2009/0267562 A1 * | 10/2009 | Guccione | H02J 7/342 |
| | | | 320/114 |
| 2012/0087074 A1 * | 4/2012 | Chen | G06F 1/1632 |
| | | | 361/679.02 |
| 2013/0278215 A1 * | 10/2013 | Dea | H02J 7/0044 |
| | | | 320/111 |
| 2016/0065702 A1 * | 3/2016 | Carnevali | H01R 31/06 |
| | | | 455/575.8 |
| 2018/0212448 A1 * | 7/2018 | Lee | B60L 1/006 |

\* cited by examiner

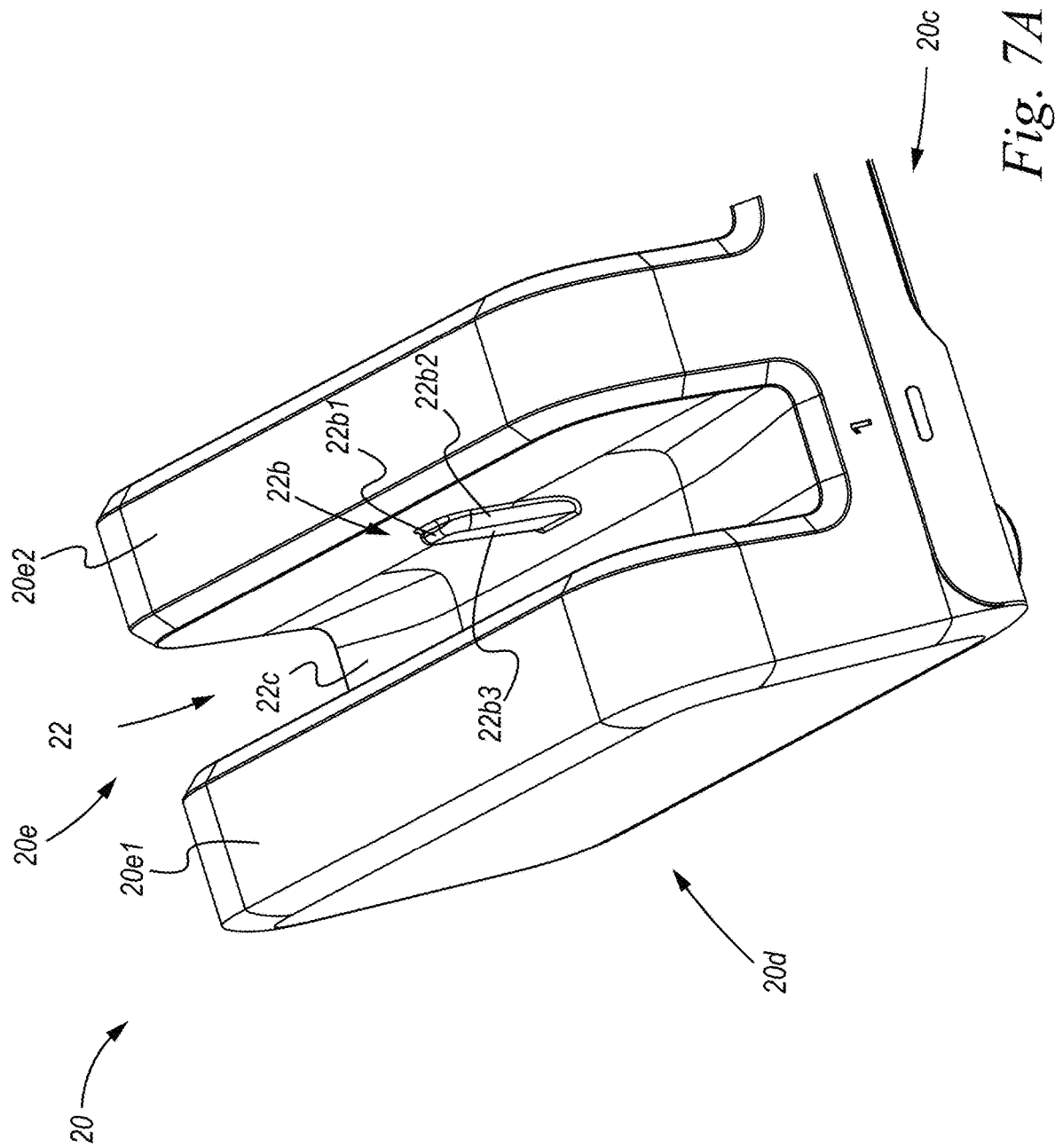

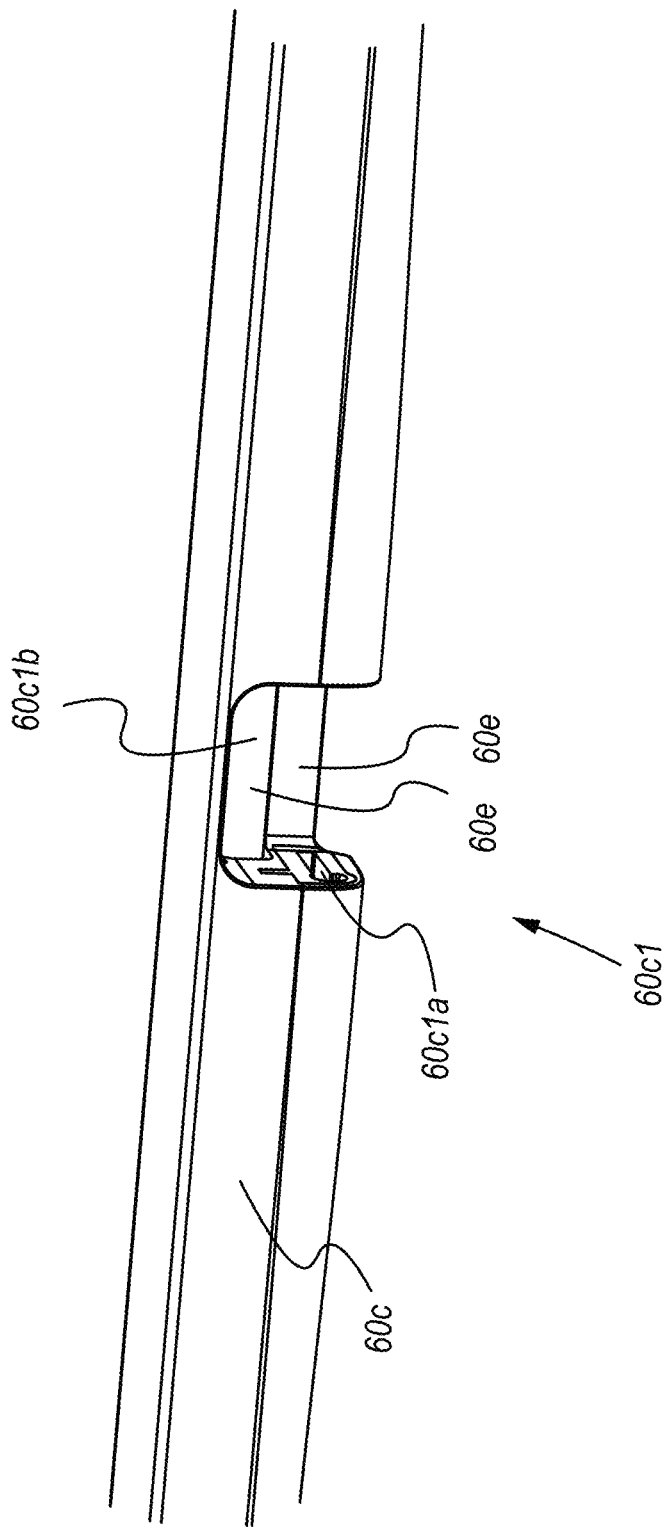

CHARGER SYSTEM FOR PORTABLE ELECTRONIC DEVICES

SUMMARY

A portable electronic device charger system for charging a plurality of portable electronic devices including first portable electronic devices being of different sizes including (I) a portable electronic device charger assembly including (A) at least one device bay including (i) a floor including an electrical interface, (ii) a first wall extending from the floor, and (iii) a second wall extending from the floor, the second wall spaced across the floor from the first wall, and oppositely facing the first wall; (II) at least one portable electronic device case assembly including (A) a base, (B) a periphery having four sides extending from the base, and (C) a power docking bay positioned on a portion of one of the four sides; and (III) at least one electrical power coupler, wherein the at least one electrical power coupler is removably electrically couplable to the at least one portable electronic device, wherein the at least one electrical power coupler is removably electrically couplable to the interface of the floor of the at least one device bay of the portable electronic device charger, wherein the at least one electrical power coupler is removably couplable to the first wall of the at least one device bay of the portable electronic device charger, and wherein the at least one electrical power coupler is removably couplable to the at least one portable electronic device case assembly. Implementations of the at least one portable electronic device assembly include a first case that is an electronic phone case. Implementation of the at least one portable electronic device assembly include a second case that is an electronic tablet case. Implementations the electrical power coupler is removably couplable to the first case, and wherein the electrical power coupler is removably couplable to the second case. Implementation of the first wall include an elongated protrusion removably couplable with the electrical power coupler. Implementations of the electrical power coupler include an engagement notch removable couplable to the elongated protrusion of the first wall. Implementations of the first wall have first and second edges, and wherein the elongated protrusion is located midway between the first and second edges. Implementations of the elongated protrusion extend vertically, wherein the elongated protrusion includes a tapered shape, and wherein portions of the elongated protrusion closer to the floor are wider than portions of the elongated protrusion farther from the floor. Implementations of the electrical power coupler have a tapered engagement notch shaped to removably couple with the tapered shape of the elongated protrusion. Implementations of the electrical interface are compatible with at least one of the following: lightning electrical power specifications and electrical power specifications of at least one usb variant. Implementations of the electrical interface include at least one pogo pin electrical contact. Implementations of the elongated protrusion are positioned in a central location on the first wall relative to the electrical interface on the floor. Implementations of a first of the sides of the at least one portable electronic device case include an aperture, wherein the electrical power coupler includes a coupler plug including specifications for portable electronic device coupling, and wherein the coupler plug at least partially extends through the aperture when the electrical power coupler is coupled with the at least one portable electronic device case. Implementations of the aperture of the first side include first and second elongated side wall apertures, wherein the electrical power coupler includes first and second engagement pins, and wherein the first and second engagement pins are coupled with the first and second elongated side wall apertures when the electrical power coupler is coupled with the at least one portable electronic device case. Implementations of the first and second engagement pins are rectangular in shape. Implementations of the electrical power coupler are removably couplable with the at least one portable electronic device case assembly without requiring coupling with a portable electronic device. Implementations of the electrical power coupler is removably couplable with the electrical interface of the at least one device bay of the portable electronic device charger when the electrical coupler is coupled with the at least one portable electronic device case without requiring the electrical power coupler to be coupled with a portable electronic device.

A portable electronic device charger system for charging a plurality of portable electronic devices including first portable electronic devices being of different sizes including (I) at least one portable electronic device case assembly including (A) a base, (B) a periphery having four sides extending from the base, and (C) a power docking bay positioned on one of the four sides; and (II) at least one electrical power coupler including an engagement notch, wherein the at least one electrical power coupler is removably couplable to the at least one portable electronic device, wherein the engagement notch of the at least one electrical power coupler is removably couplable to at least one device bay of a portable electronic device charger, and wherein the at least one electrical power coupler is removably couplable to the at least one portable electronic device case. Implementations of a first of the sides of the at least one portable electronic device case include an aperture, wherein the electrical power coupler includes a coupler plug including specifications for portable electronic device coupling, and wherein the coupler plug at least partially extends through the aperture when the electrical power coupler is coupled with the at least one portable electronic device case.

A portable electronic device charger system for charging a plurality of portable electronic devices including first portable electronic devices being of different sizes including (I) at least one electrical power coupler including an engagement notch, wherein the engagement notch of the at least one electrical power coupler is removably couplable to at least one device bay of a portable electronic device charger, and wherein the at least one electrical power coupler is removably couplable to at least one portable electronic device case.

In addition to the foregoing, other aspects are described in the claims, drawings, and text forming a part of the disclosure set forth herein. Various other aspects are set forth and described in the teachings such as text (e.g., claims and/or detailed description) and/or drawings of the present disclosure. The foregoing is a summary and thus may contain simplifications, generalizations, inclusions, or omissions of detail; consequently, those skilled in the art will appreciate that the summary is illustrative only and is NOT intended to be in any way limiting. Other aspects, features, and advantages of the devices and/or processes and/or other subject matter described herein will become apparent in the teachings set forth herein.

BRIEF DESCRIPTION OF THE FIGURES

FIG. 7A is an enlarged front perspective view of a portion of the multi-bay portable electronic device charger assembly of FIG. 7.

FIG. 18A is an enlarged front perspective view of a portion of the portable electronic tablet case of FIG. 18.

For a more complete understanding of implementations, reference now is made to the following descriptions taken in connection with the accompanying drawings. The use of the same symbols in different drawings typically indicates similar or identical items, unless context dictates otherwise.

Figure 1:
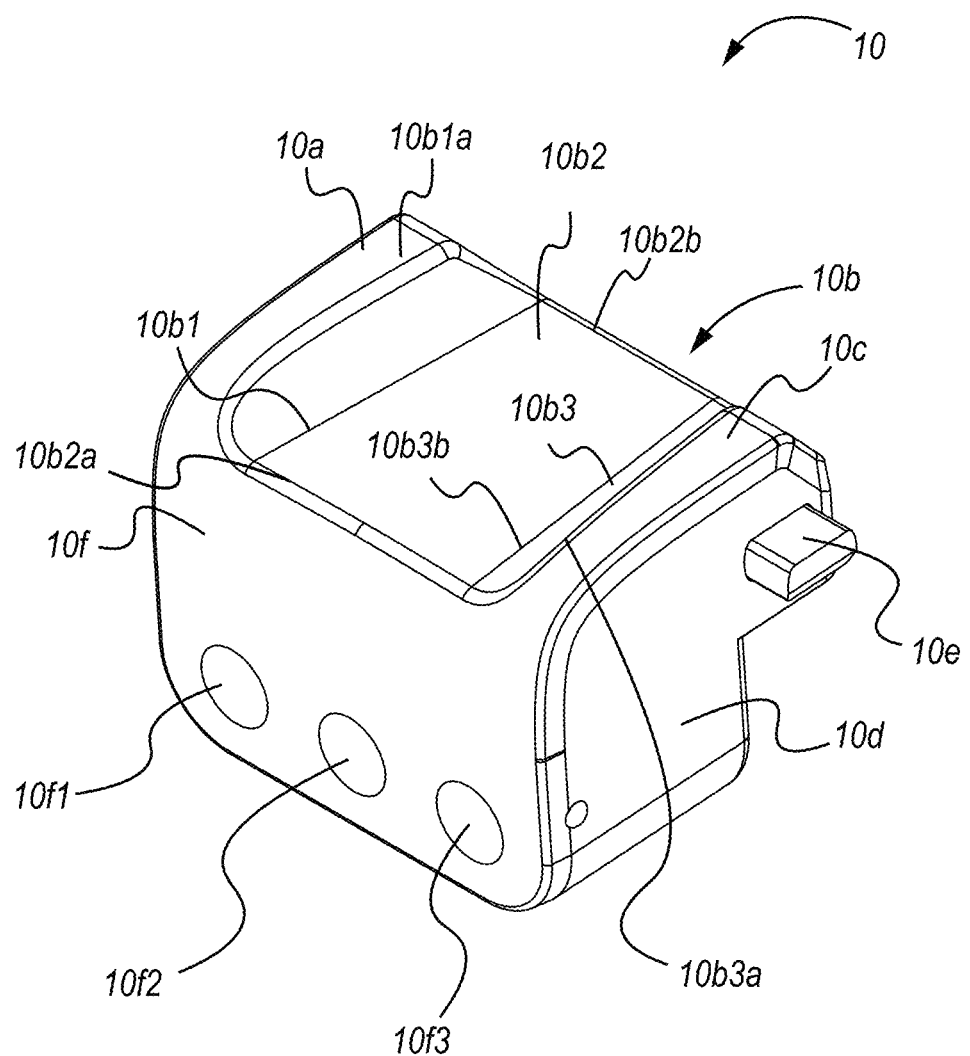
FIG. 1 is a front perspective view of an electrical power coupler.

With reference now to the figures, shown are one or more examples of Charger System for Portable Electronic Devices, articles of manufacture, compositions of matter for same that may provide context, for instance, in introducing one or more processes and/or devices described herein.

DETAILED DESCRIPTION

In the following detailed description, reference is made to the accompanying drawings, which form a part hereof. In the drawings, similar symbols typically identify similar components, unless context dictates otherwise. The illustrative implementations described in the detailed description, drawings, and claims are not meant to be limiting. Other implementations may be utilized, and other changes may be made, without departing from the spirit or scope of the subject matter presented here.

Turning to FIG. 1, depicted therein is a front perspective view of electrical power coupler 10. Depicted implementation of electrical power coupler 10 is shown to include ridge portion 10a, engagement notch 10b, ridge portion 10c, side portion 10d, engagement pin 10e, and base front 10f. Depicted implementation of engagement notch 10b is shown to include side portion 10*b*1 with edge portion 10*b*1*a*, depression portion 10*b*2, and side portion 10*b*3 with edge portion 10*b*3*a*. Depicted implementation of base front 10*f* is shown to include electrical connector 10*f*1, electrical connector 10*f*2, and electrical connector 10*f*3.

Figure 2:
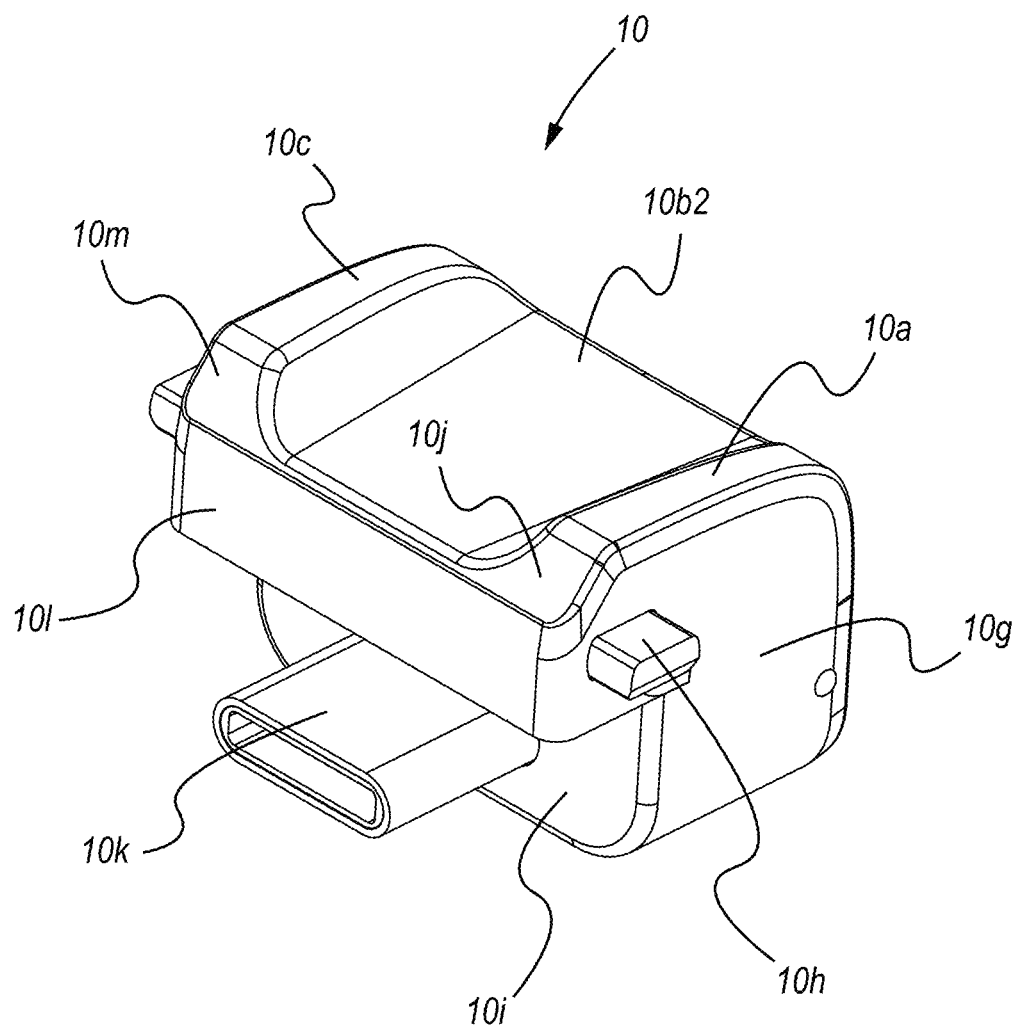
FIG. 2 is a rear perspective view of the electrical power coupler of FIG. 1.

Turning to FIG. 2, depicted therein is a rear perspective view of electrical power coupler 10. Depicted implementation of electrical power coupler 10 is shown to include side portion 10*g*, engagement pin 10*h*, base rear 10*i*, ridge rear portion 10*j*, coupler plug 10*k*, ledge rear portion 10*l*, and ridge rear portion 10*m*.

Figure 3:
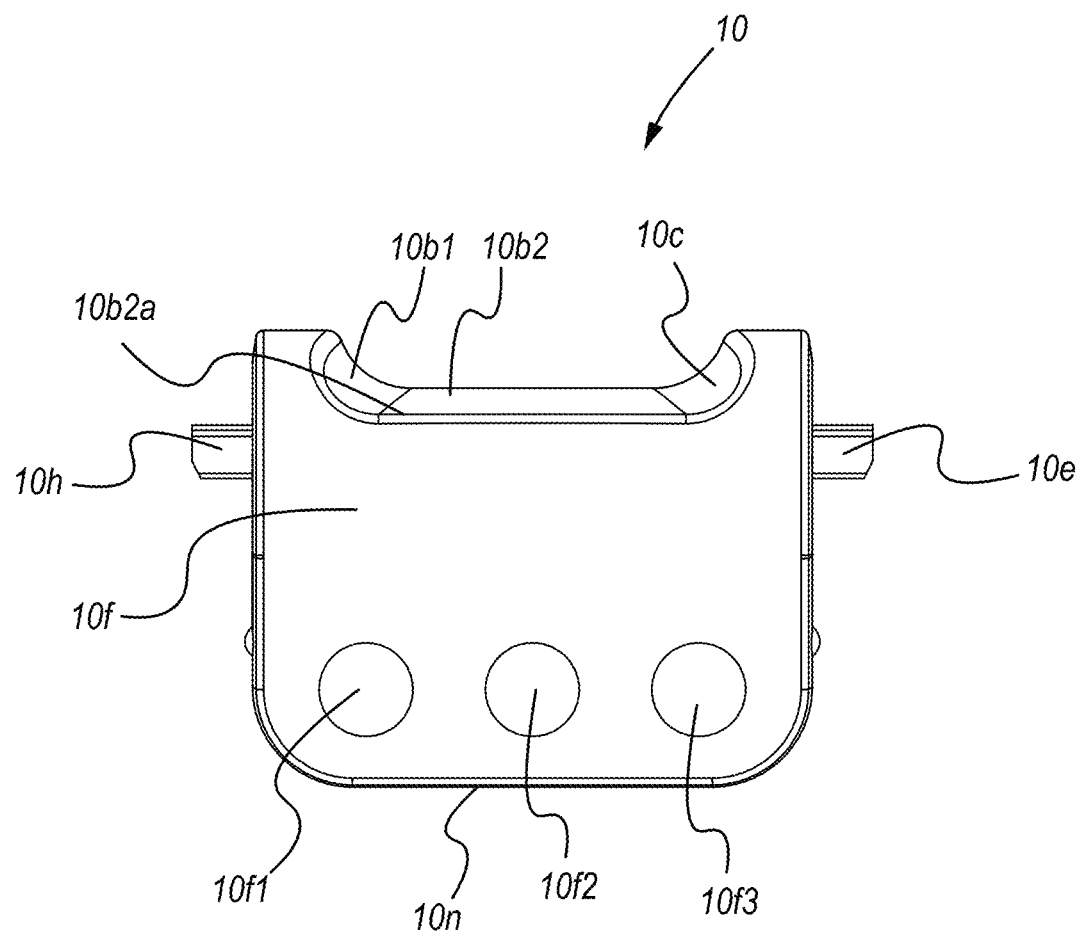
FIG. 3 is a front elevational view of the electrical power coupler of FIG. 1.

Turning to FIG. 3, depicted therein is a front elevational view of electrical power coupler 10.

Figure 4:
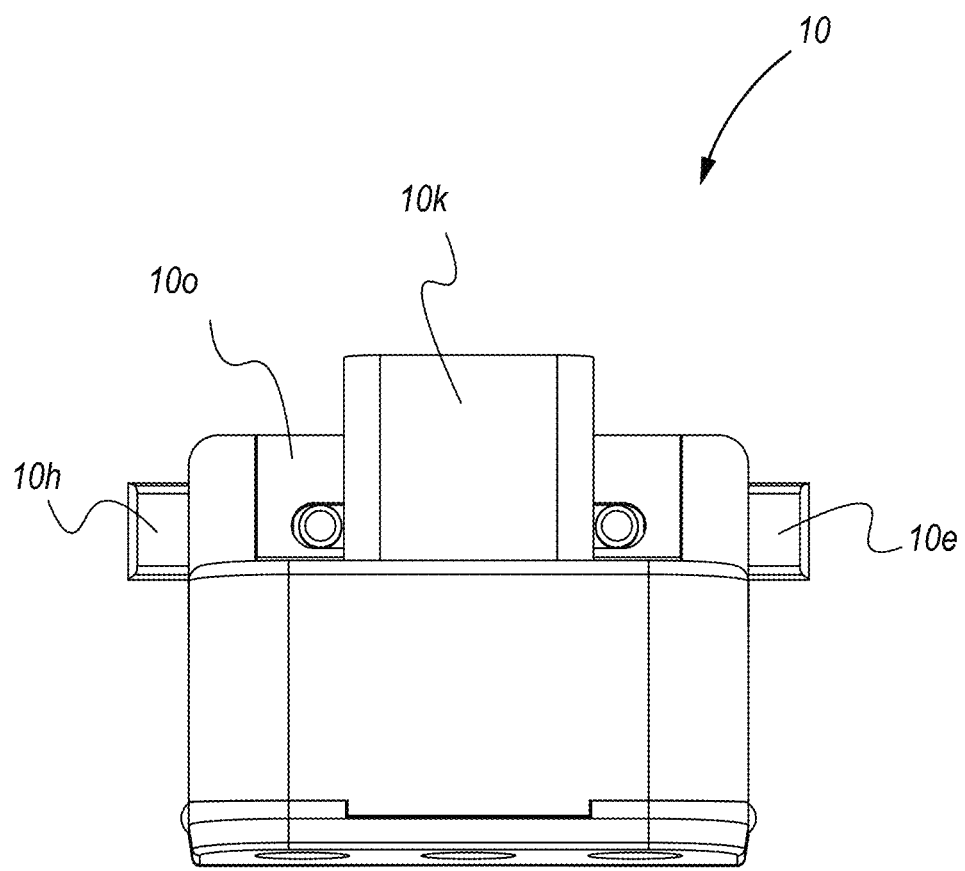
FIG. 4 is a bottom plan view of the electrical power coupler of FIG. 1.

Turning to FIG. 4, depicted therein is a bottom plan view of electrical power coupler 10. Depicted implementation of electrical power coupler 10 is shown to include ledge bottom portion 10*o*.

Figure 5:
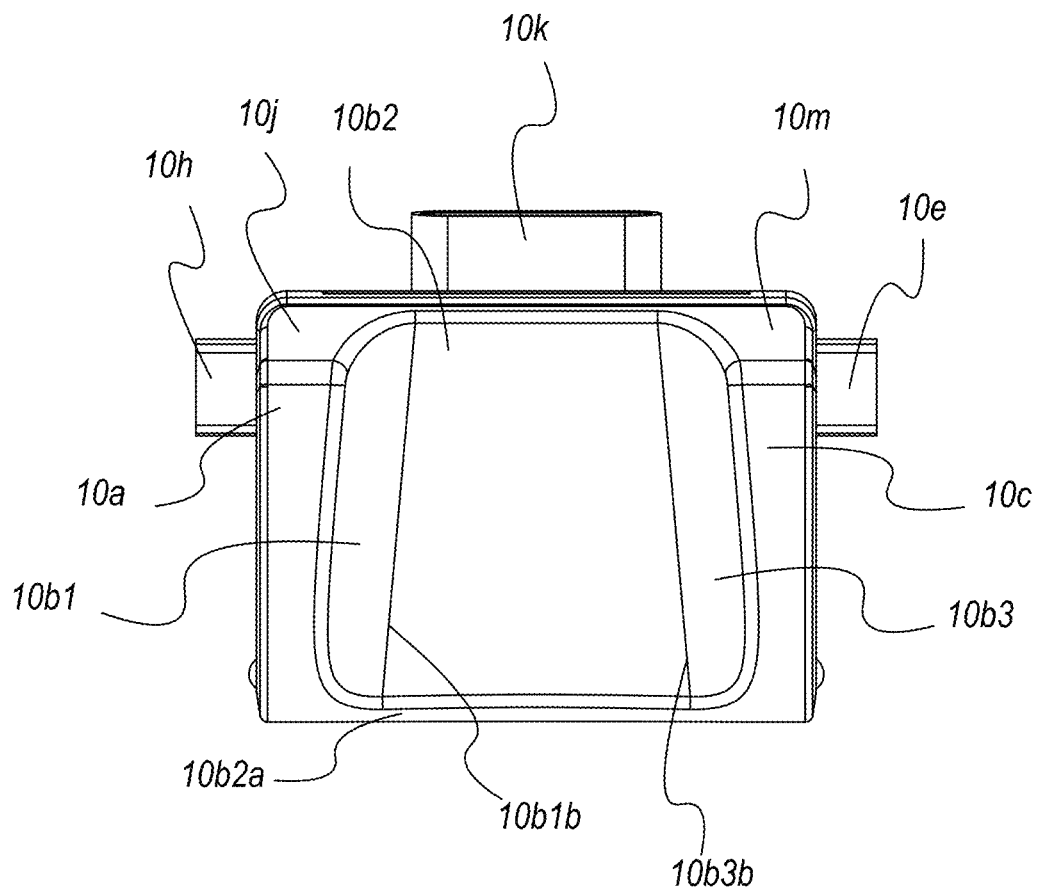
FIG. 5 is a top plan view of the electrical power coupler of FIG. 1.

Turning to FIG. 5, depicted therein is a top plan view of electrical power coupler 10.

Figure 6:
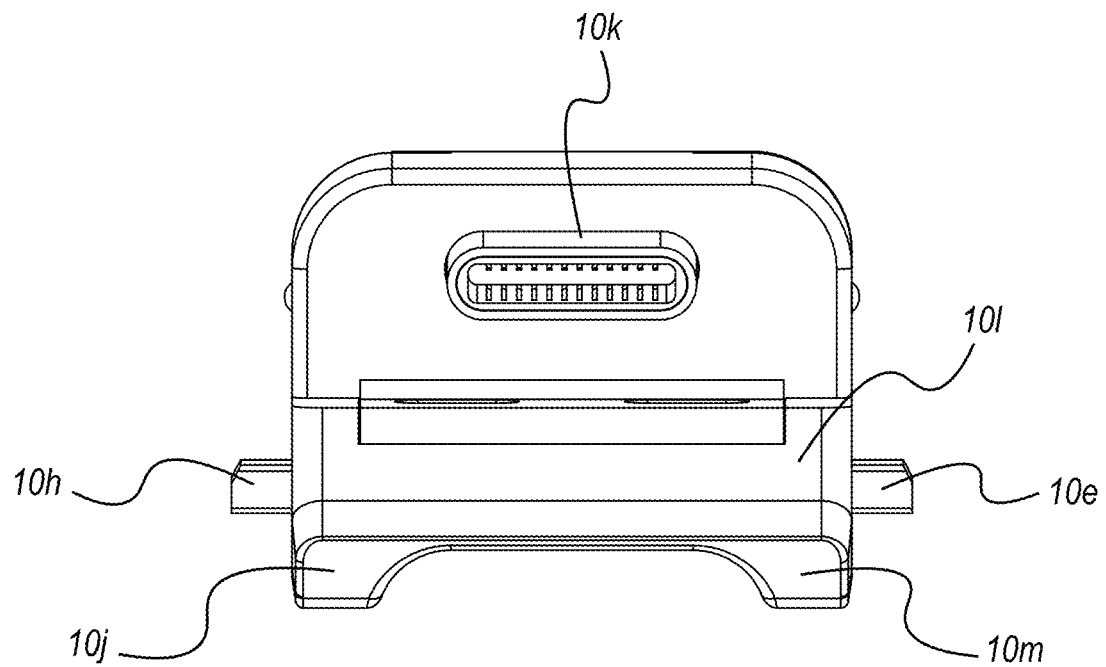
FIG. 6 is a rear elevational view of the electrical power coupler of FIG. 1.

Turning to FIG. 6, depicted therein is a rear elevational view of electrical power coupler 10.

Figure 7:
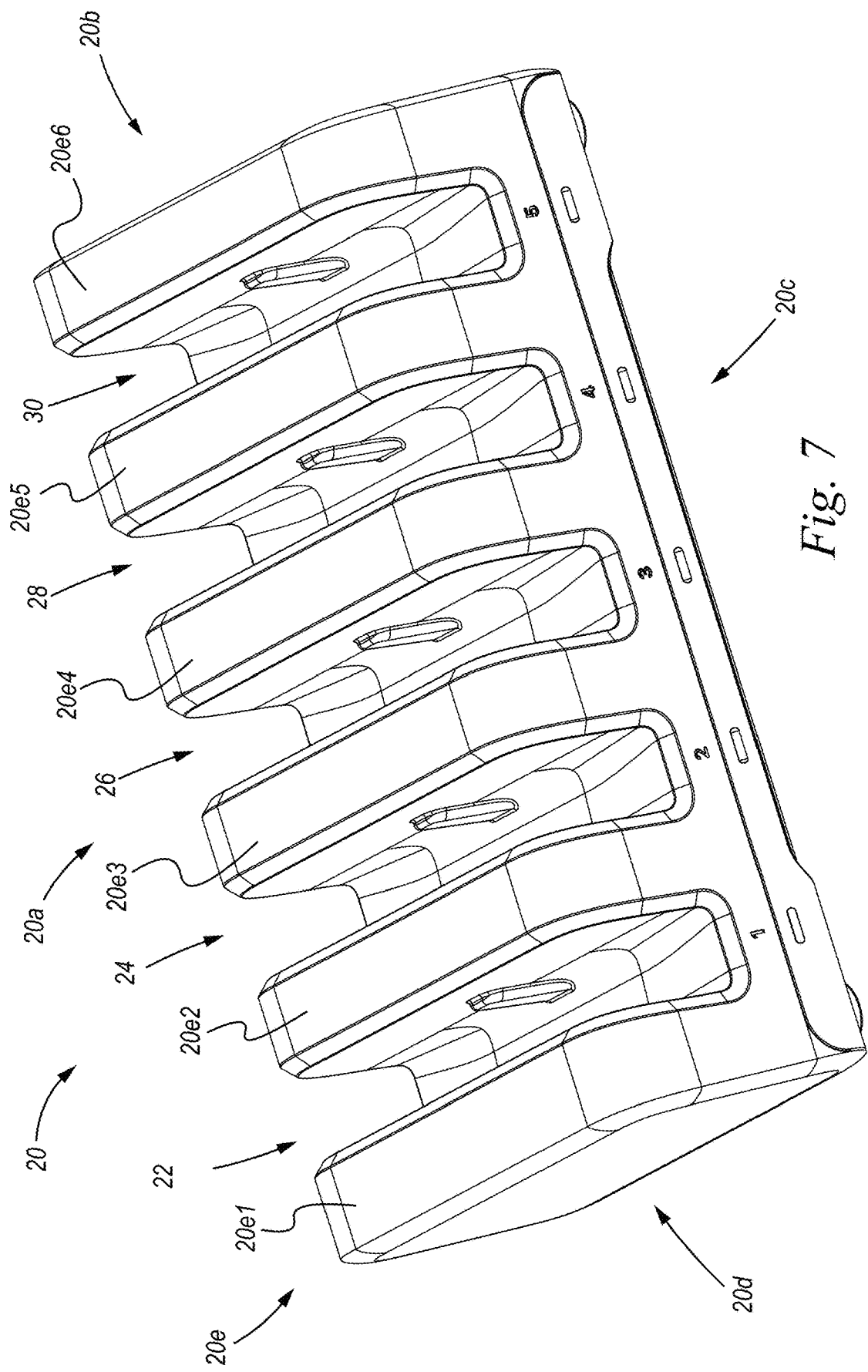
FIG. 7 is a front perspective view of a multi-bay portable electronic device charger assembly.

Turning to FIG. 7, depicted therein is a front perspective view of multi-bay portable electronic device charger assembly 20. Depicted implementation of multi-bay portable electronic device charger assembly 20 is shown to include side 20*a*, end 20*b*, side 20*c*, end 20*d*, and upper portion 20*e*. Depicted implementation of upper portion 20*e* is shown to include divider wall 20*e*1, divider wall 20*e*2, divider wall 20*e*3, divider wall 20*e*4, divider wall 20*e*5, divider wall 20*e*6, and 20*e*7. Depicted implementation of multi-bay portable electronic device charger assembly 20 is shown to include device bay 22, device bay 24, device bay 26, device bay 28, and device bay 30.

Turning to FIG. 7A, depicted therein is an enlarged front perspective view of a portion of multi-bay portable electronic device charger assembly 20. Depicted implementation of device bay 22 is shown to include side 22*a*, elongated protrusion 22*b*, and floor 22*c*. Depicted implementation of elongated protrusion 22*b* is shown to include top portion 22*b*1, side portion 22*b*2, and face portion 22*b*3.

Figure 8:
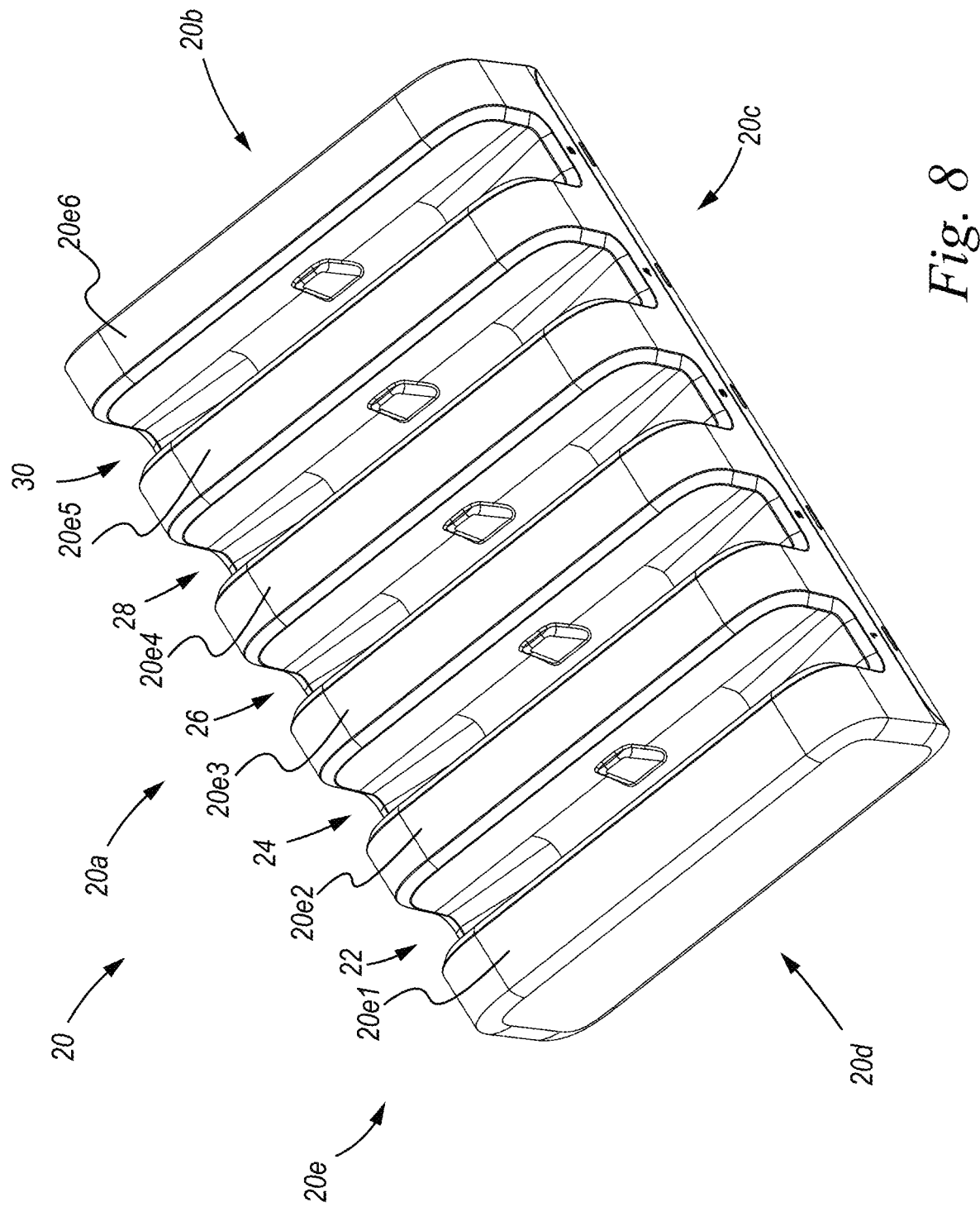
FIG. 8 is a front perspective view of the multi-bay portable electronic device charger assembly of FIG. 7.

Turning to FIG. 8, depicted therein is a front perspective view of multi-bay portable electronic device charger assembly 20.

Figure 8A:
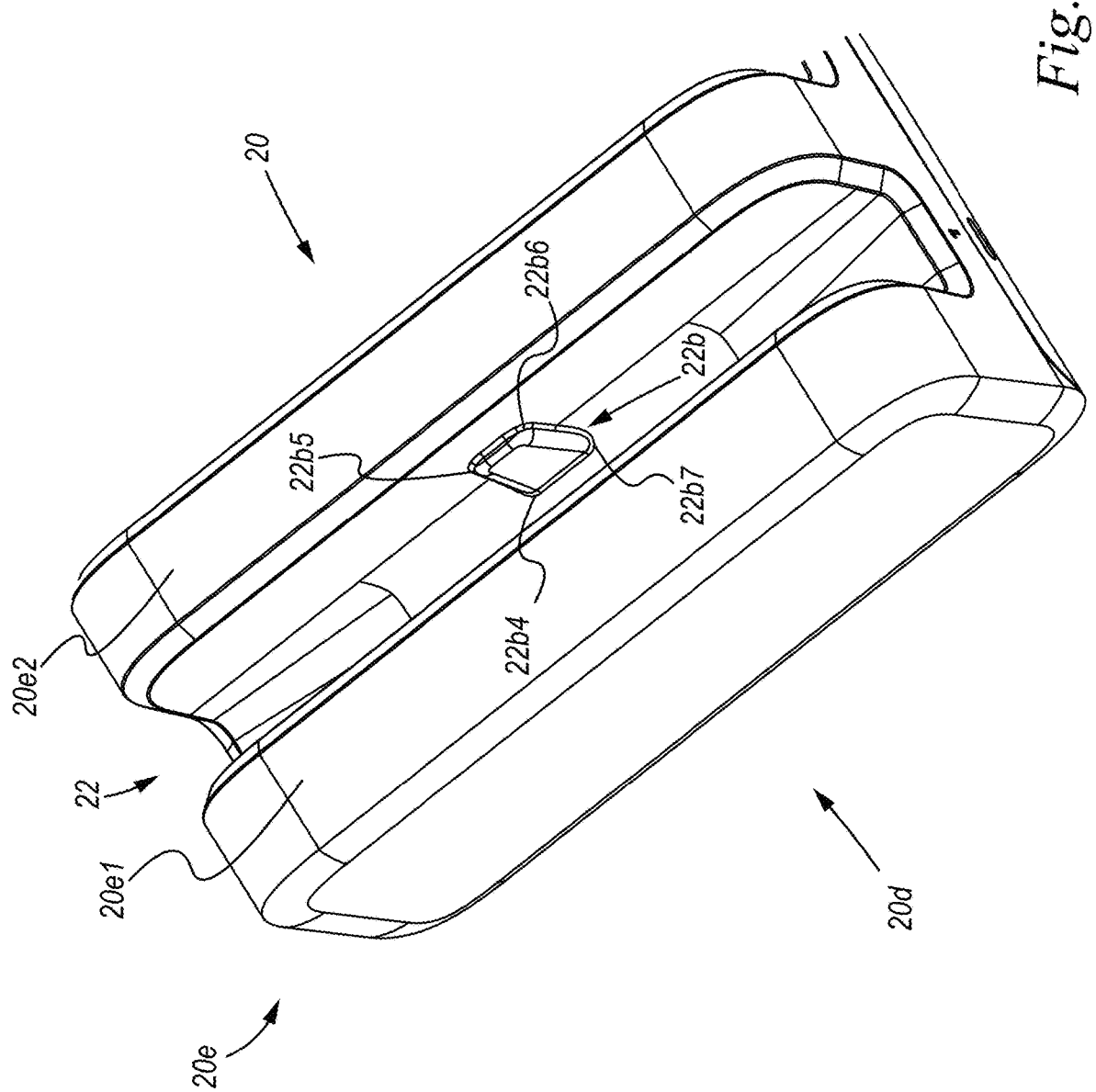
FIG. 8A is an enlarged front perspective view of a portion of the multi-bay portable electronic device charger assembly of FIG. 8.

Turning to FIG. 8A, depicted therein is an enlarged front perspective view of a portion of multi-bay portable electronic device charger assembly 20. Depicted implementation of device bay 22 is shown to include bottom side edge 22*b*4, top side edge 22*b*5, top side edge 22*b*6, and bottom side edge 22*b*7.

Figure 9:
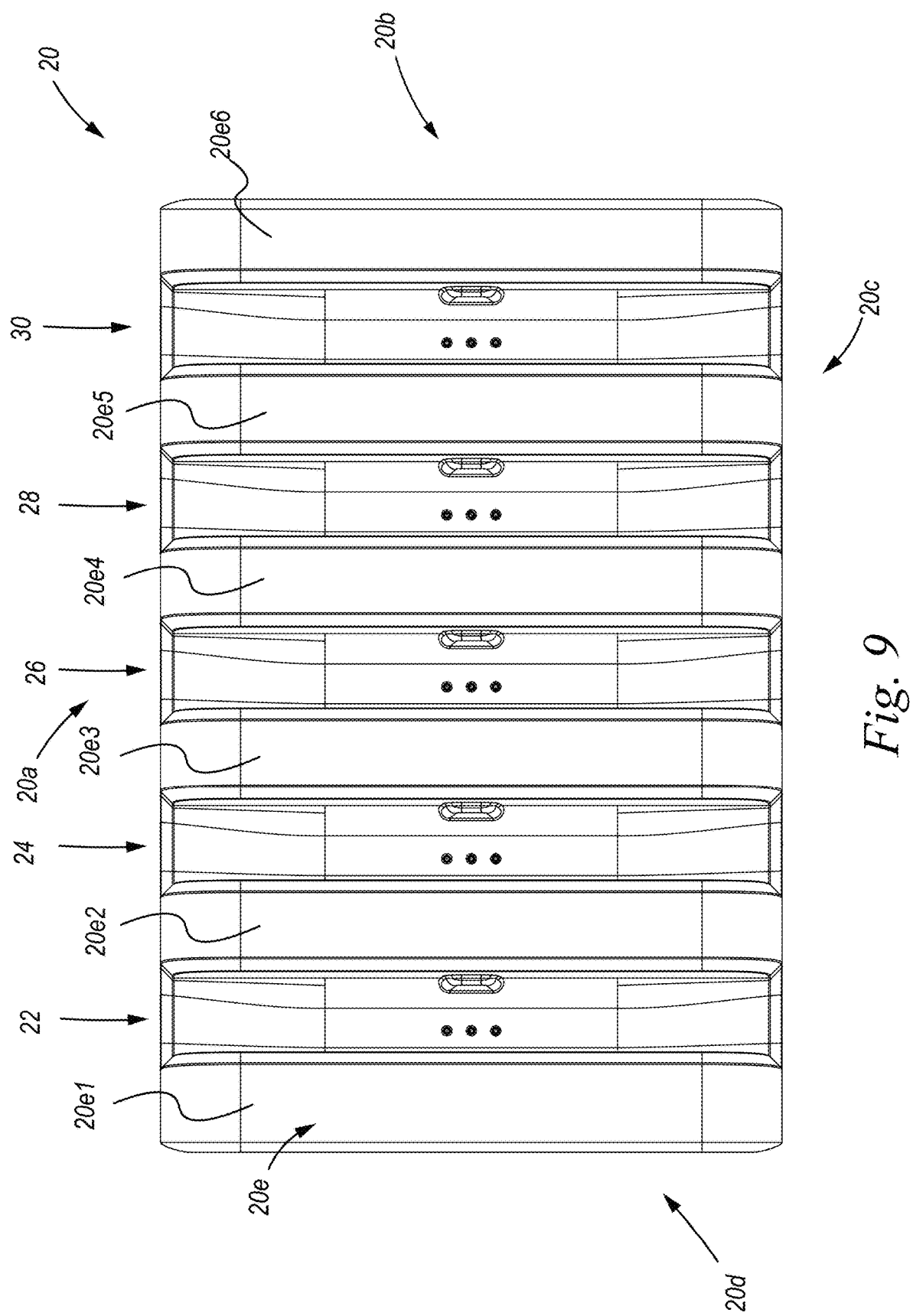
FIG. 9 is a top plan view of the multi-bay portable electronic device charger assembly of FIG. 7.

Turning to FIG. 9, depicted therein is a top plan view of multi-bay portable electronic device charger assembly 20.

Figure 9A:
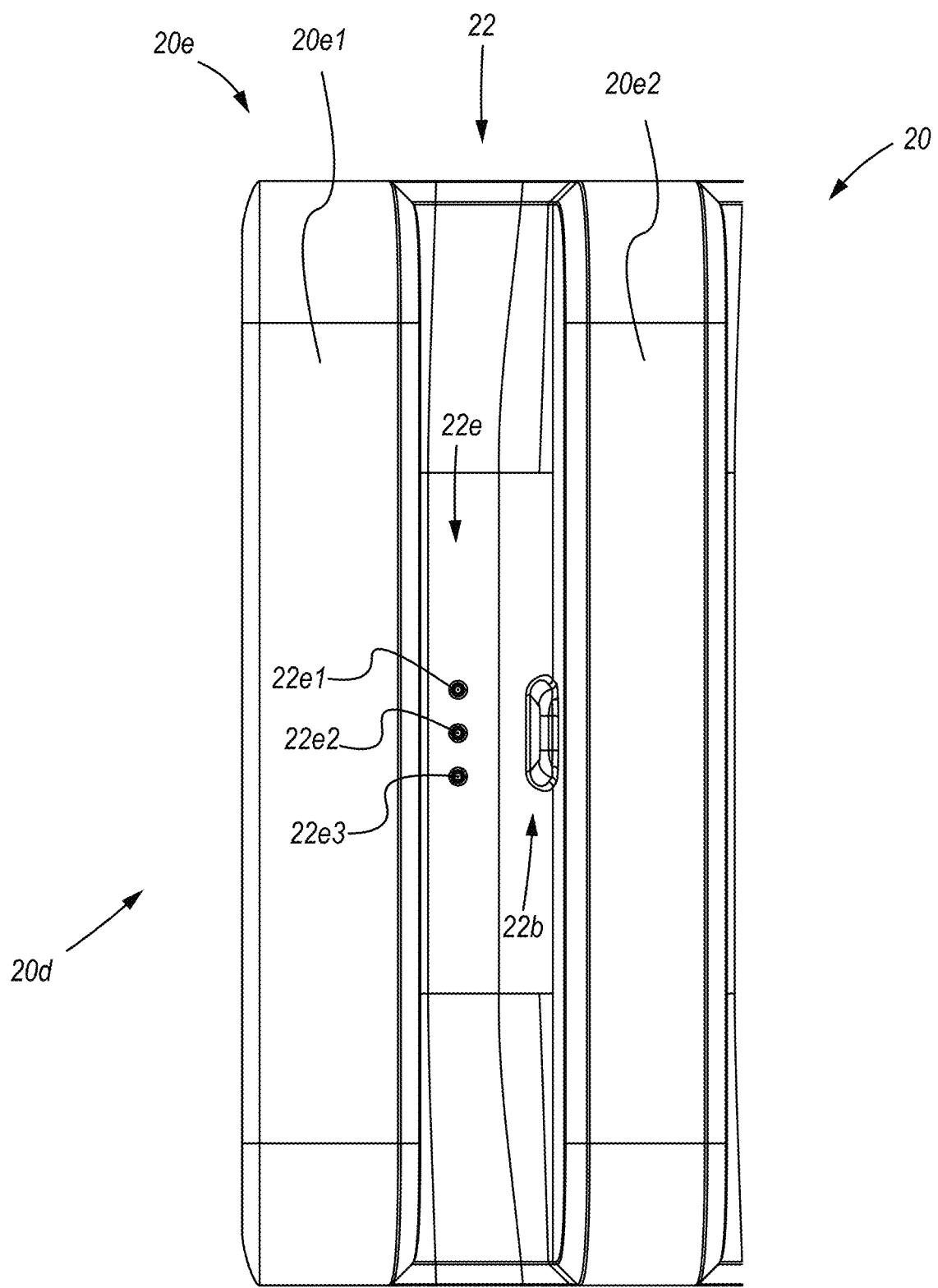
FIG. 9A is an enlarged top plan view of a portion of the multi-bay portable electronic device charger assembly of FIG. 9.

Turning to FIG. 9A, depicted therein is an enlarged top plan view of a portion of multi-bay portable electronic device charger assembly 20. Depicted implementation of device bay 22 is shown to include side 22*d*, electrical interface 22*e* (e.g., having lightning or one or more usb variant electrical power specifications) with electrical contact 22*e*1, electrical contact 22*e*2, and electrical contact 22*e*3 (e.g., pogo pin style electrical contacts).

Figure 10:
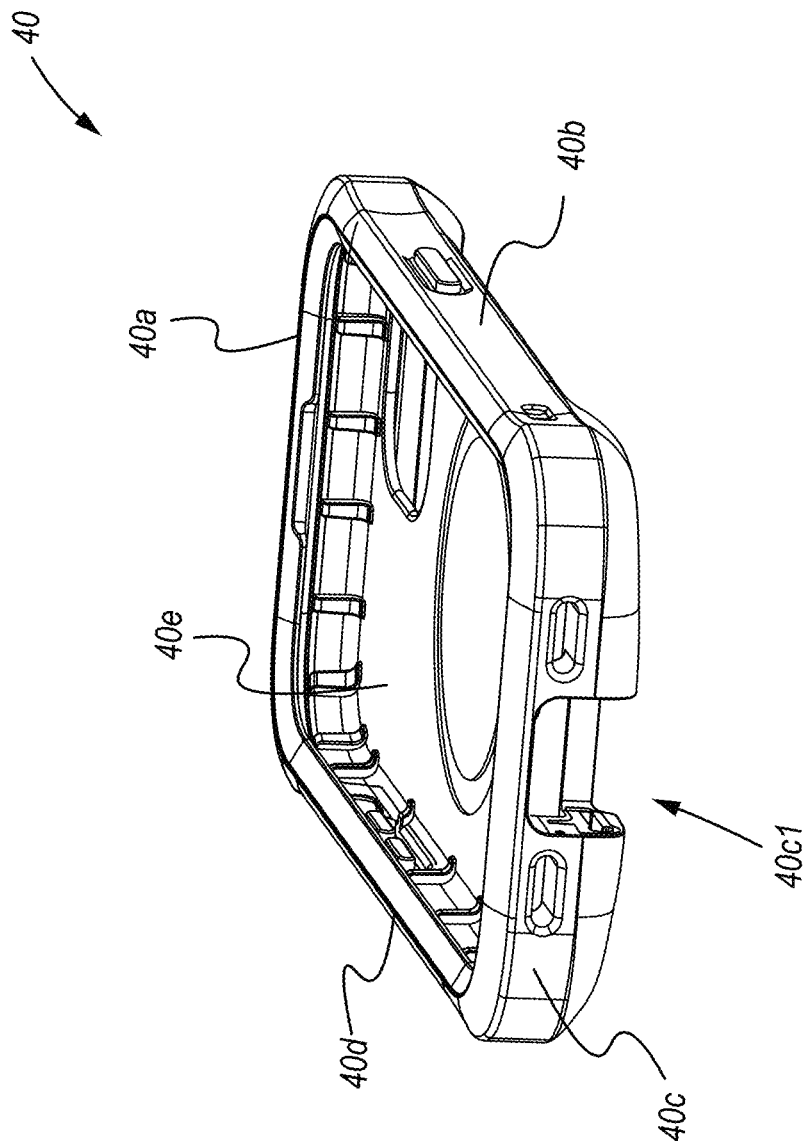
FIG. 10 is a front perspective view of a portable electronic phone case.

Turning to FIG. 10, depicted therein is a front perspective view of portable electronic phone case 40. Depicted implementation of portable electronic phone case 40 is shown to include portable electronic phone case 40, side 40*a*, side 40*b*, side 40*c* with power docking bay 40*c*1, side 40*d*, and base 40*e*.

Figure 10A:
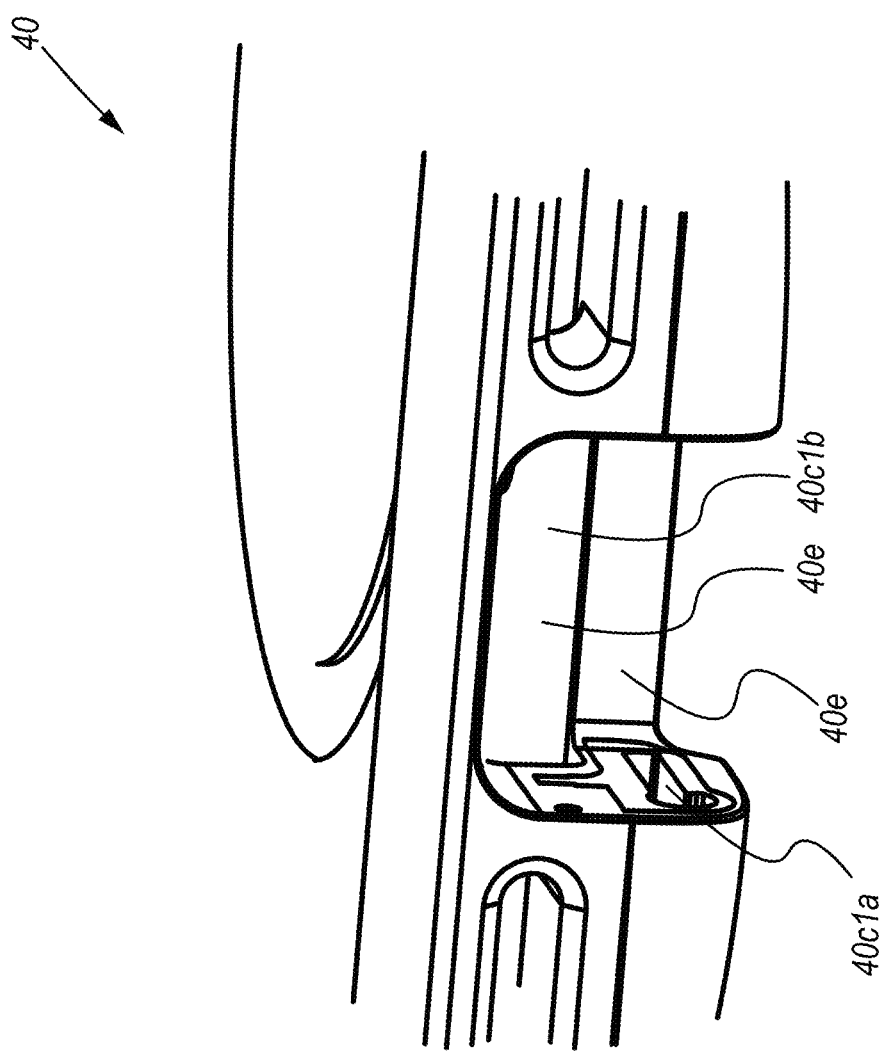
FIG. 10A is an enlarged front perspective view of a portion of the portable electronic phone case of FIG. 10.

Turning to FIG. 10A, depicted therein is an enlarged front perspective view of a portion of portable electronic phone case 40. Depicted implementation of power docking bay 40*c*1 is shown to include elongated aperture 40*c*1*a*, and aperture 40*c*1*b*.

Figure 11:
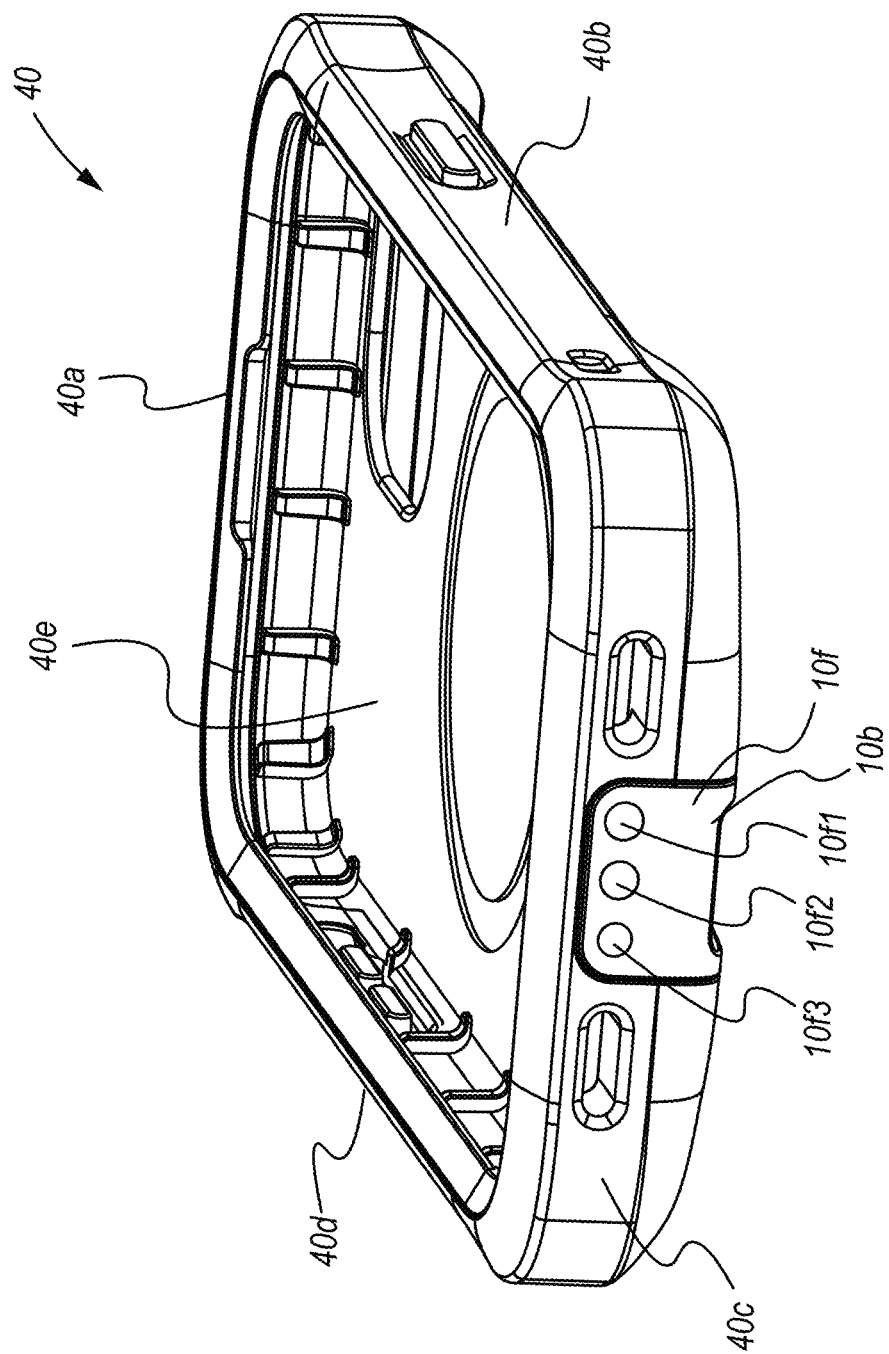
FIG. 11 is a front perspective view of the electrical power coupler of FIG. 1 coupled with the portable electronic phone case of FIG. 10.

Turning to FIG. 11, depicted therein is a front perspective view of electrical power coupler 10 coupled with portable electronic phone case 40.

Figure 12:
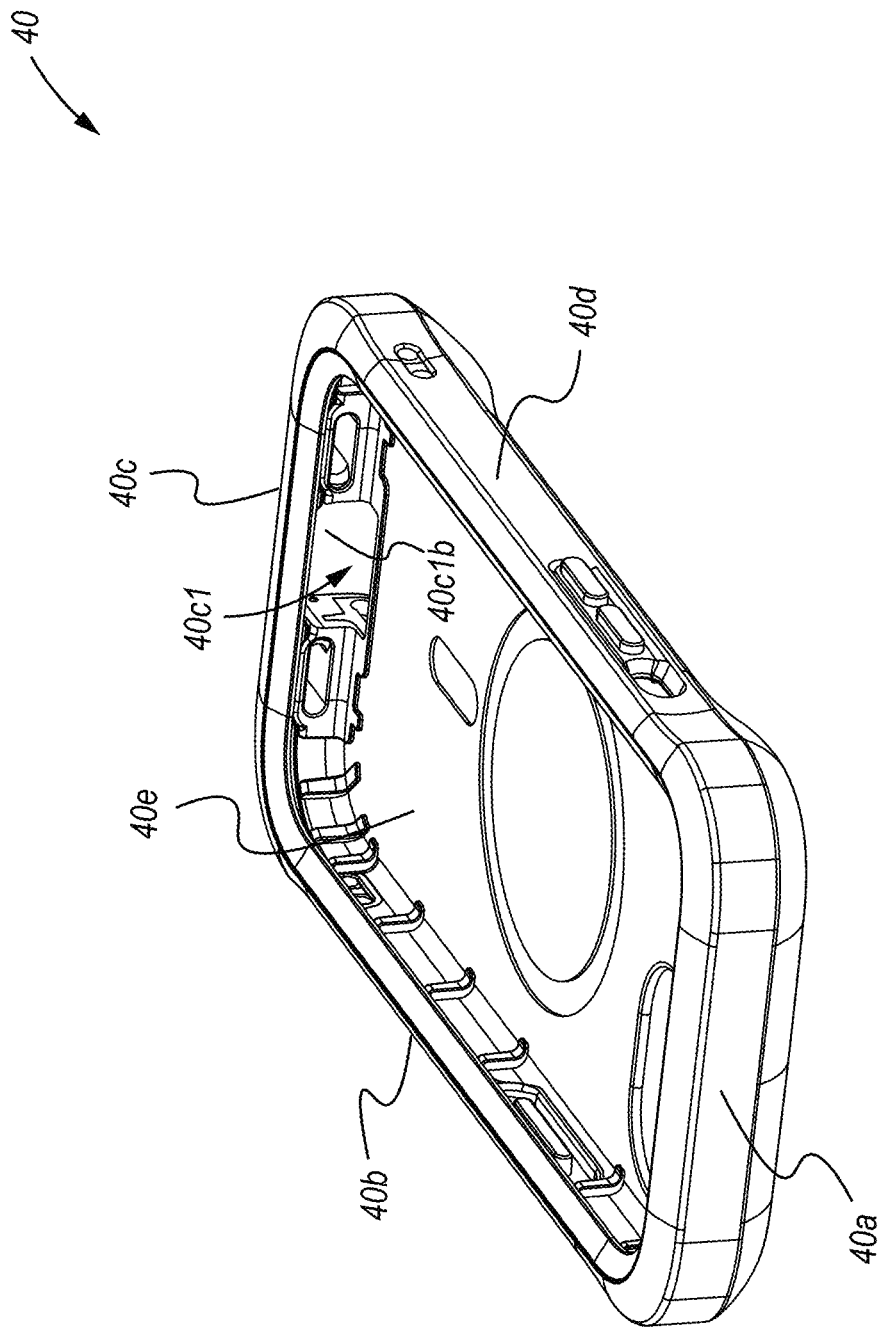
FIG. 12 is a rear perspective view of the portable electronic phone case of FIG. 10.

Turning to FIG. 12, depicted therein is a rear perspective view of portable electronic phone case 40.

Figure 12A:
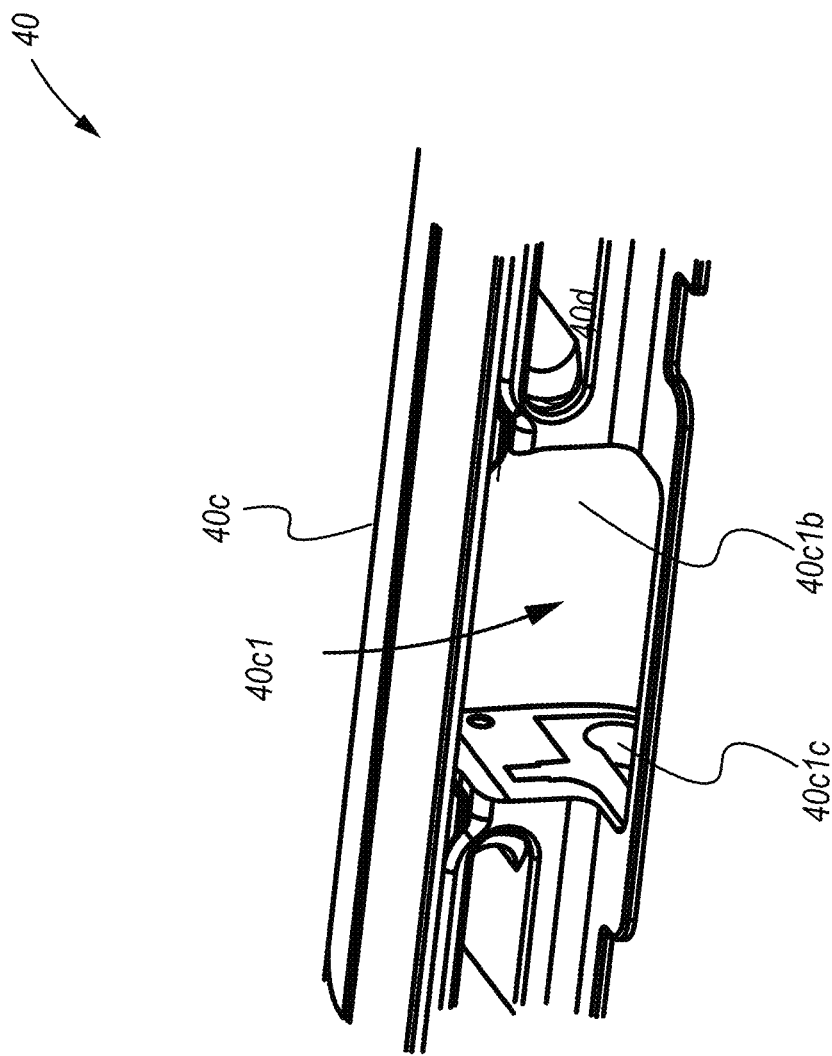
FIG. 12A is an enlarged rear perspective view of a portion of the portable electronic phone case of FIG. 10.

Turning to FIG. 12A, depicted therein is an enlarged rear perspective view of a portion of portable electronic phone case 40. Depicted implementation of power docking bay 40*c*1 is shown to include elongated aperture 40*c*1*c*.

Figure 13:
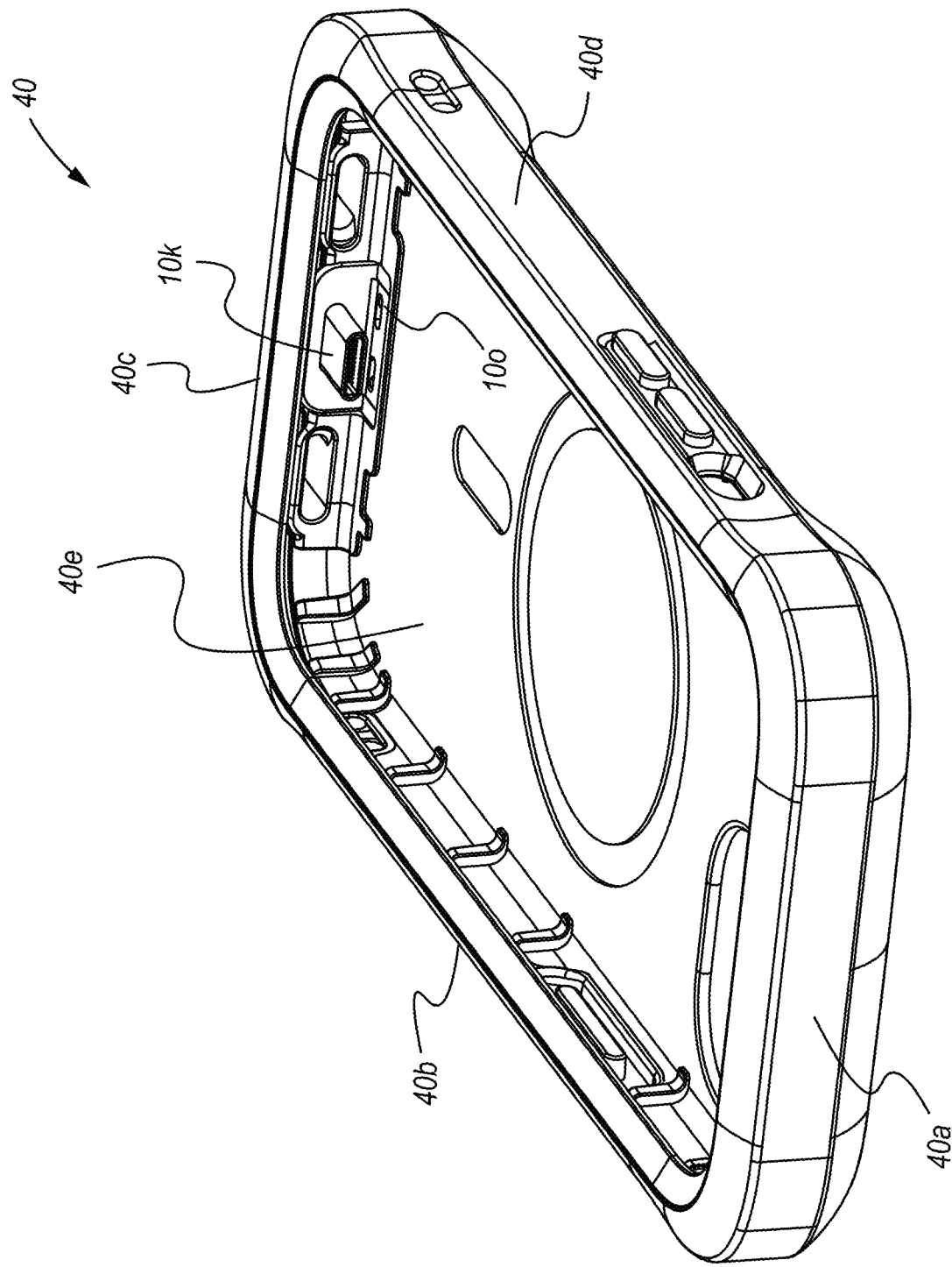
FIG. 13 is a rear perspective view of the electrical power coupler of FIG. 1 coupled with the portable electronic phone case of FIG. 10.

Turning to FIG. 13, depicted therein is a rear perspective view of electrical power coupler 10 coupled with portable electronic phone case 40.

Figure 14:
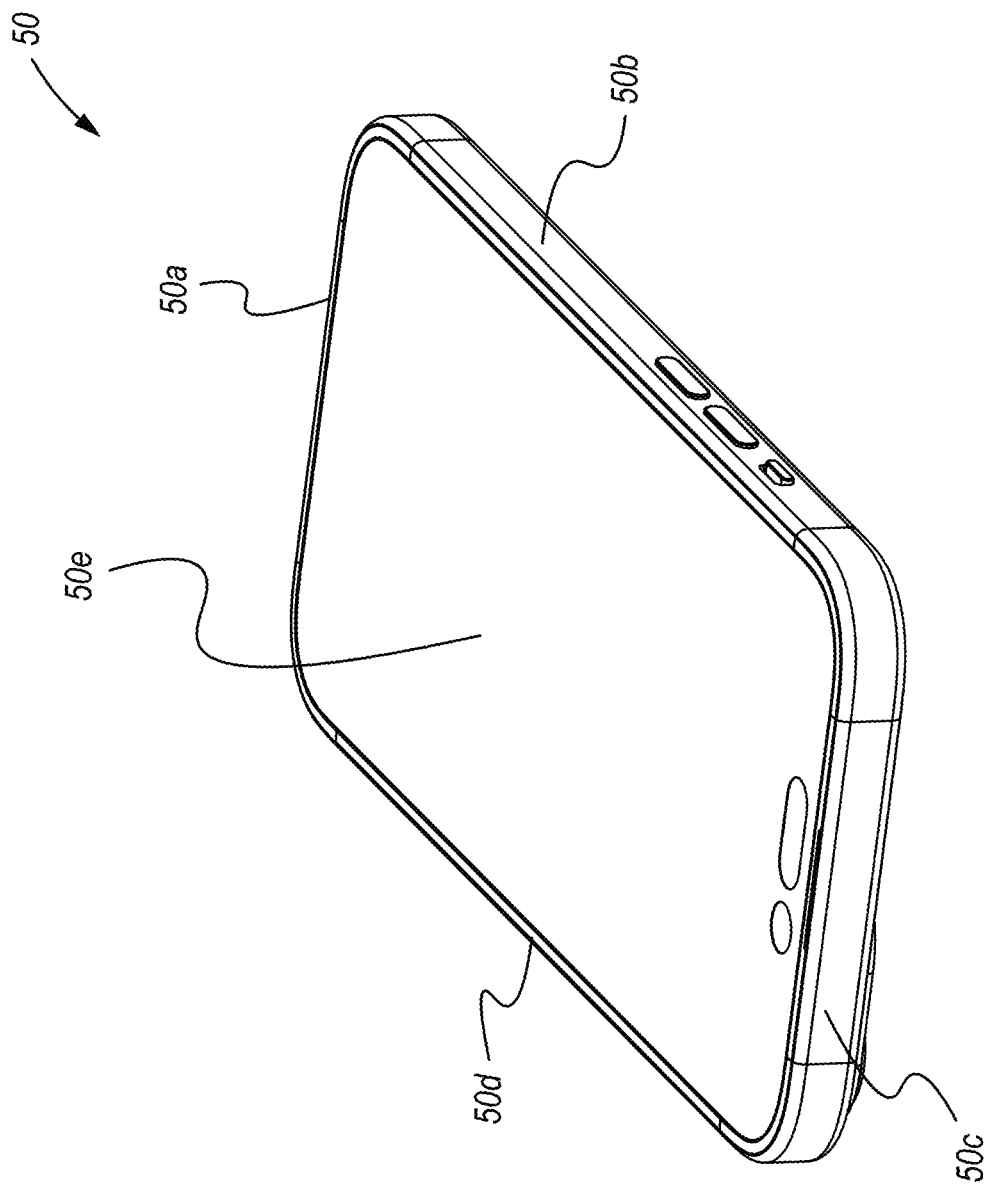
FIG. 14 is a rear perspective view of a portable electronic phone.

Turning to FIG. 14, depicted therein is a rear perspective view of portable electronic phone 50. Depicted implementation of portable electronic phone 50 is shown to include side 50*a*, side 50*b*, side 50*c*, side 50*d*, and display 50*e*.

Figure 15:
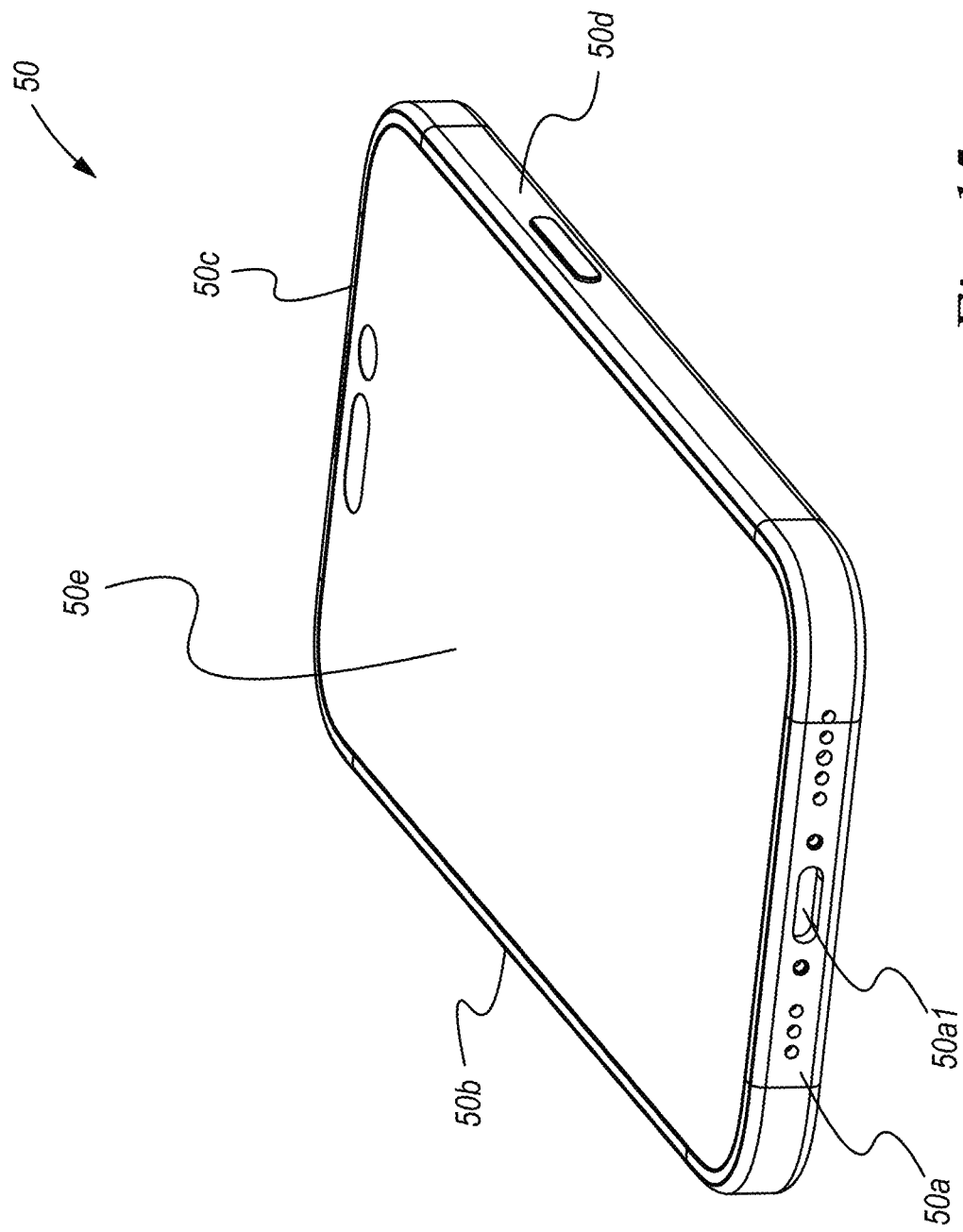
FIG. 15 is a front perspective view of the portable electronic phone of FIG. 14.

Turning to FIG. 15, depicted therein is a front perspective view of the portable electronic phone of FIG. 14. Depicted implementation of portable electronic phone 50 is shown to include electrical port 50*a*1.

Figure 16:
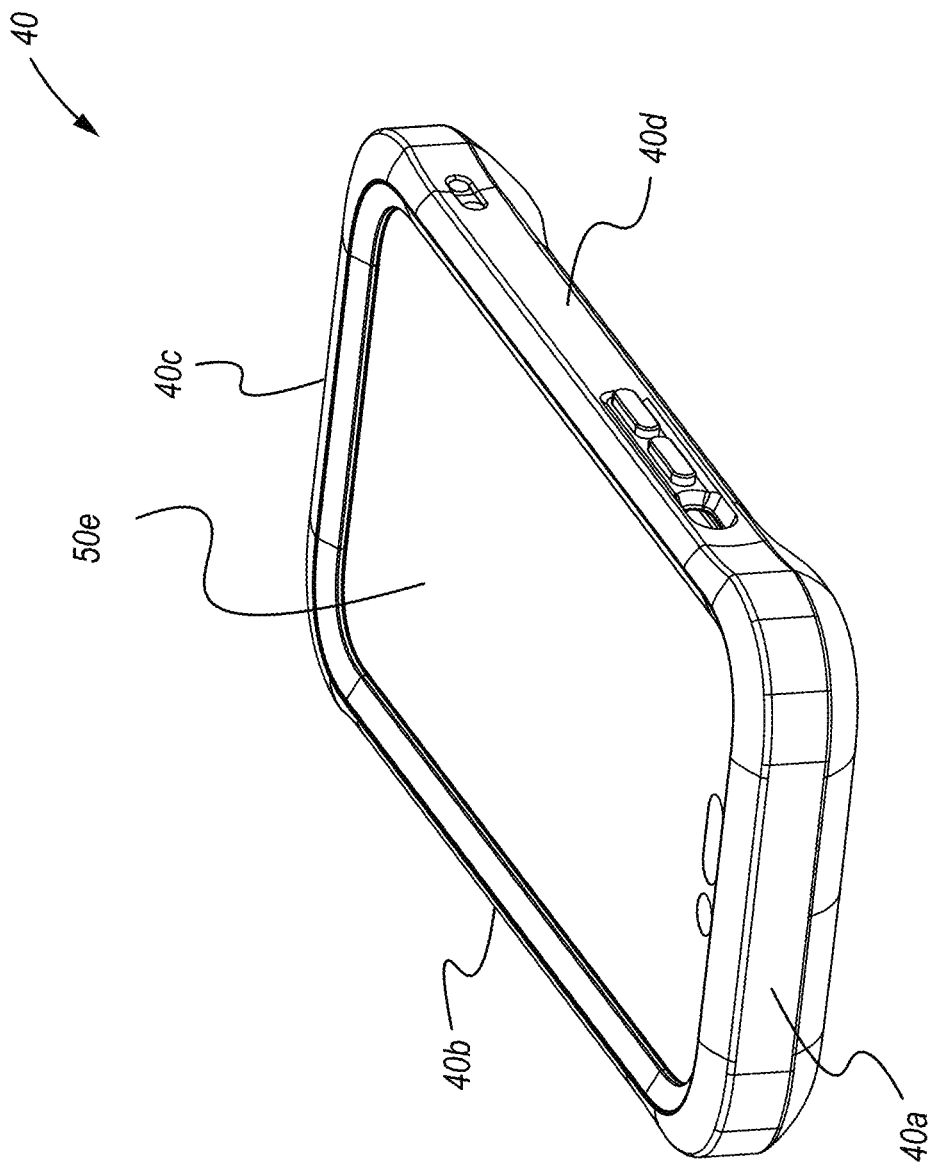
FIG. 16 is a rear perspective view of the portable electronic phone of FIG. 14 coupled with the portable electronic phone case of FIG. 10.

Turning to FIG. 16, depicted therein is a rear perspective view of portable electronic phone 50 coupled with portable electronic phone case 40.

Figure 17:
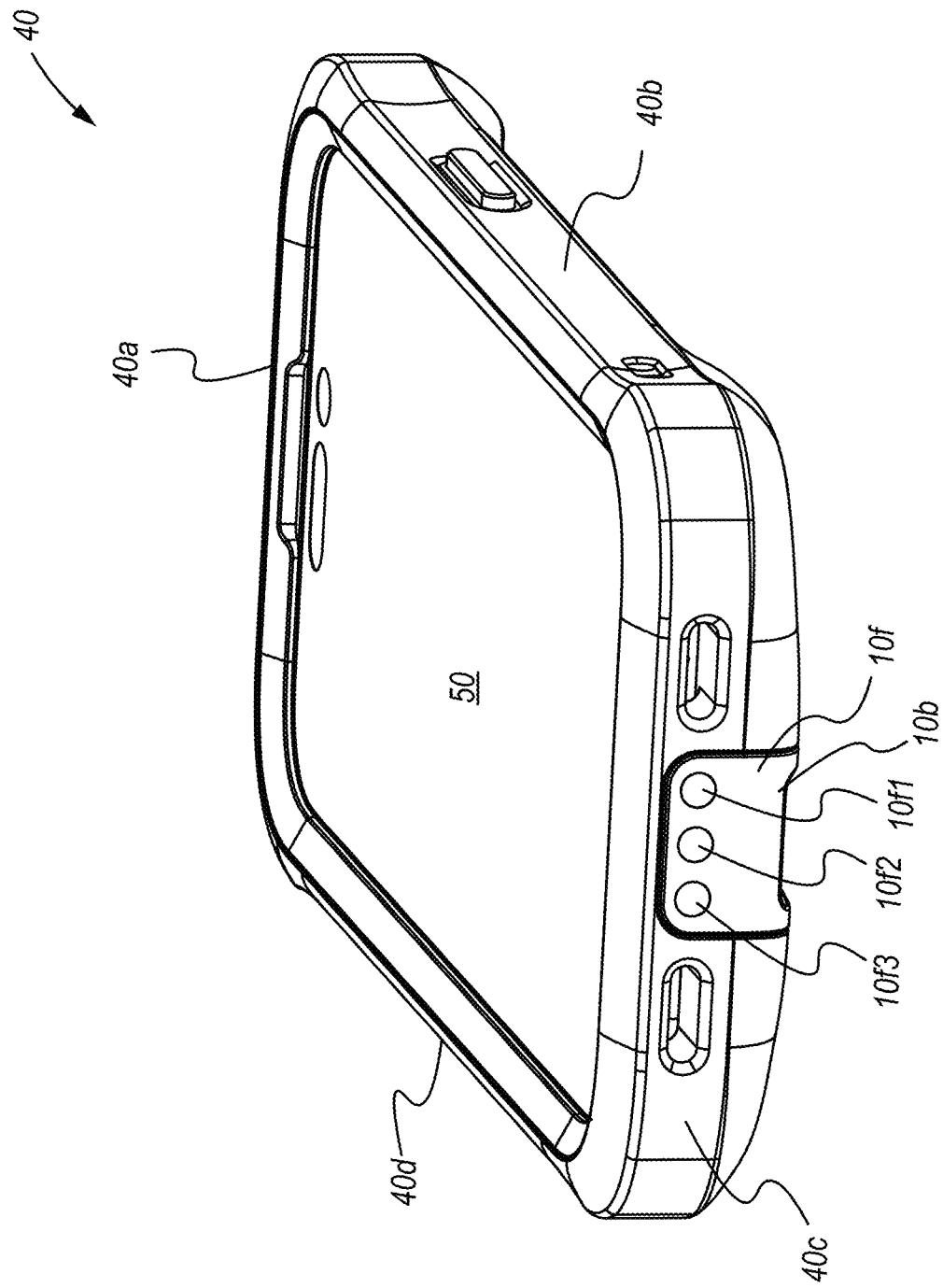
FIG. 17 is a front perspective view of a portable electronic phone of FIG. 14 coupled with the portable electronic phone case of FIG. 10.

Turning to FIG. 17, depicted therein is a front perspective view of portable electronic phone 50 coupled with portable electronic phone case 40.

Figure 18:
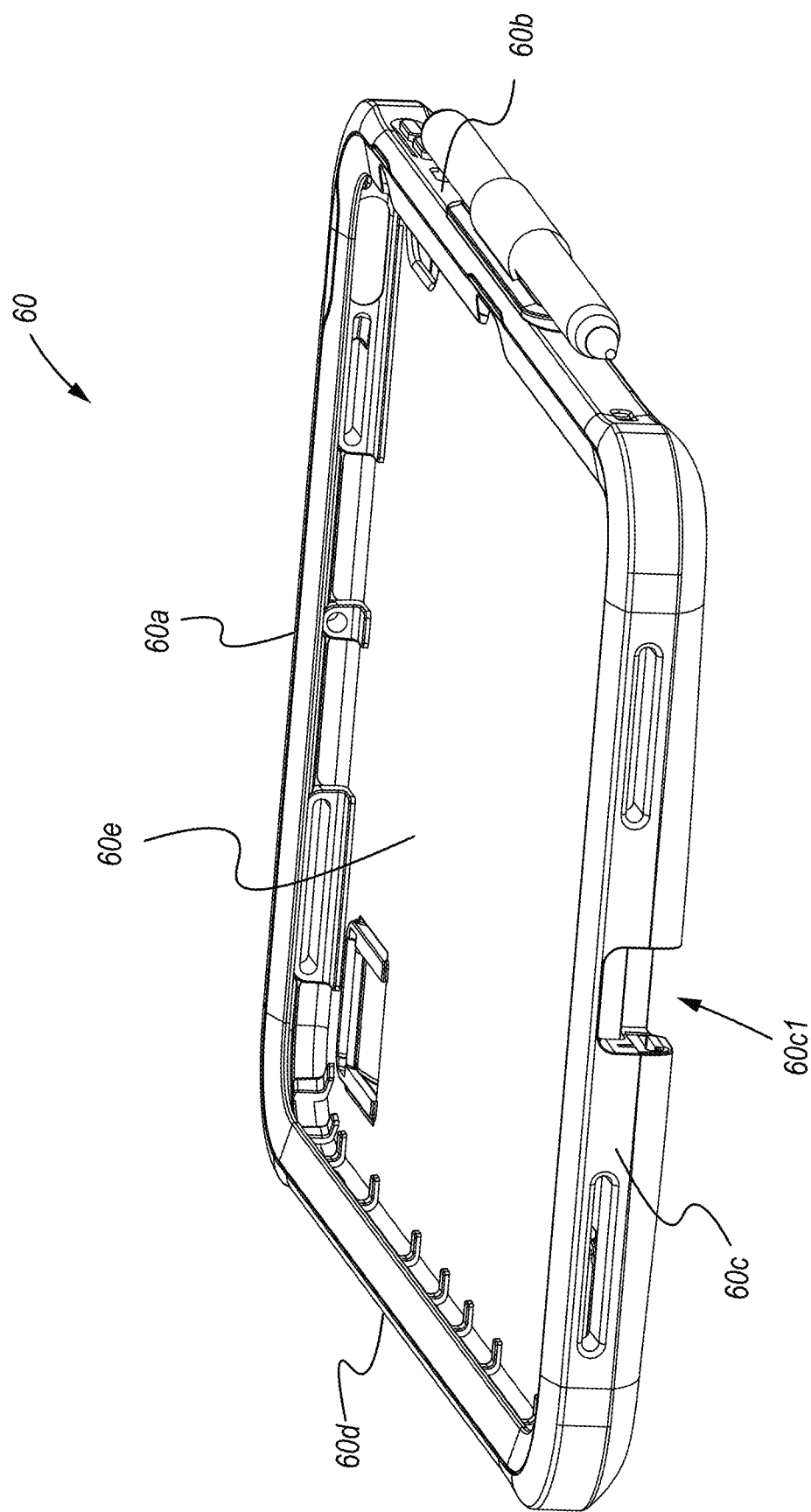
FIG. 18 is a front perspective view of a portable electronic tablet case.

Turning to FIG. 18, depicted therein is a front perspective view of portable electronic tablet case 60. Depicted implementation of portable electronic tablet case 60 is shown to include side 60*a*, side 60*b*, side 60*c* with docking bay 60*c*1, side 60*d*, and base 60*e*.

Turning to FIG. 18A, depicted therein is an enlarged front perspective view of a portion of portable electronic tablet case 60. Depicted implementation of docking bay 60*c*1 is shown to include elongated aperture 60*c*1*a*, and aperture 60*c*1*b*.

Figure 19:
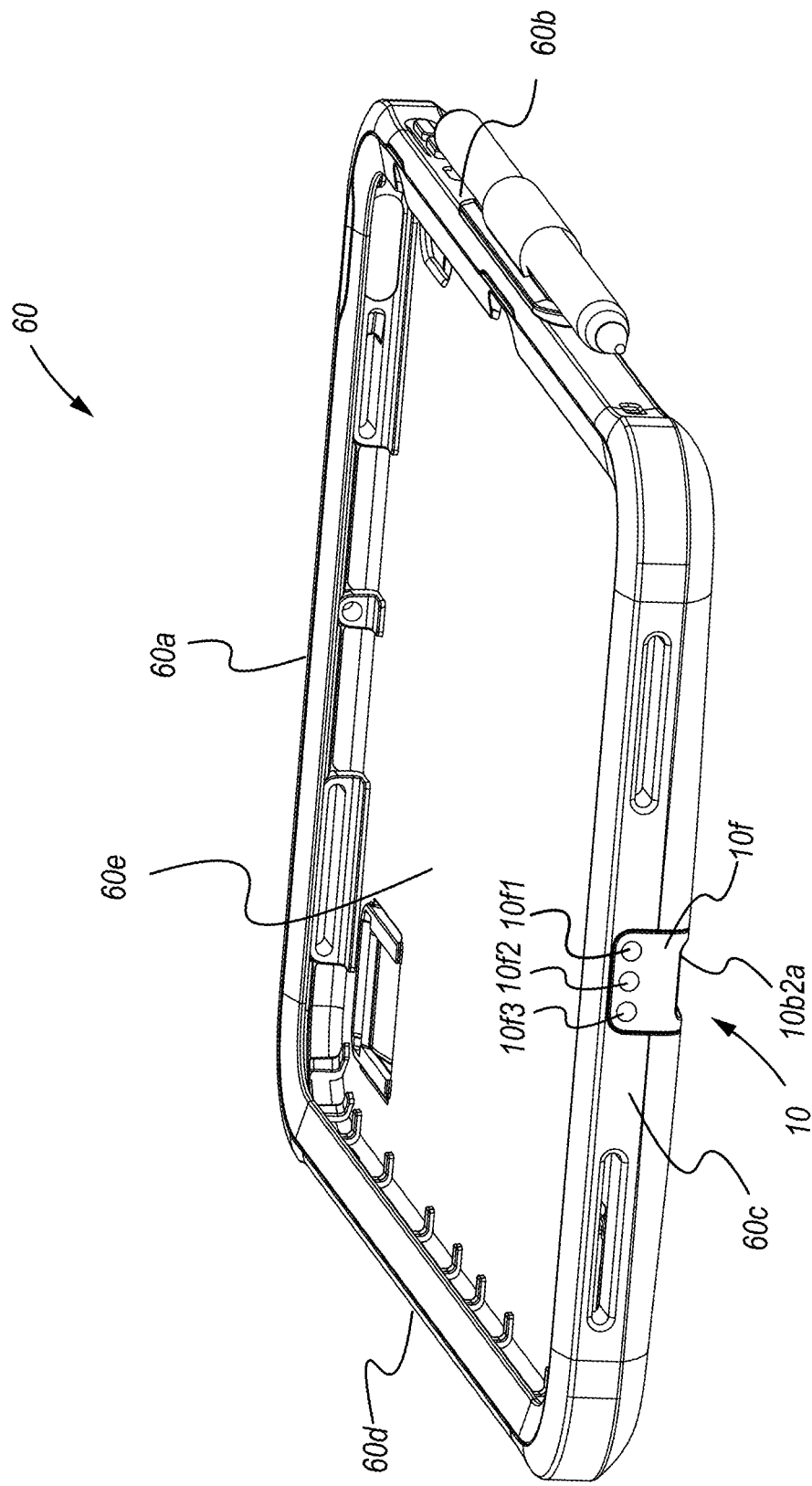
FIG. 19 is a front perspective view of the electrical power coupler of FIG. 1 coupled with the portable electronic tablet case of FIG. 18.

Turning to FIG. 19, depicted therein is a front perspective view of electrical power coupler 10 coupled with portable electronic tablet case 60.

Figure 20:
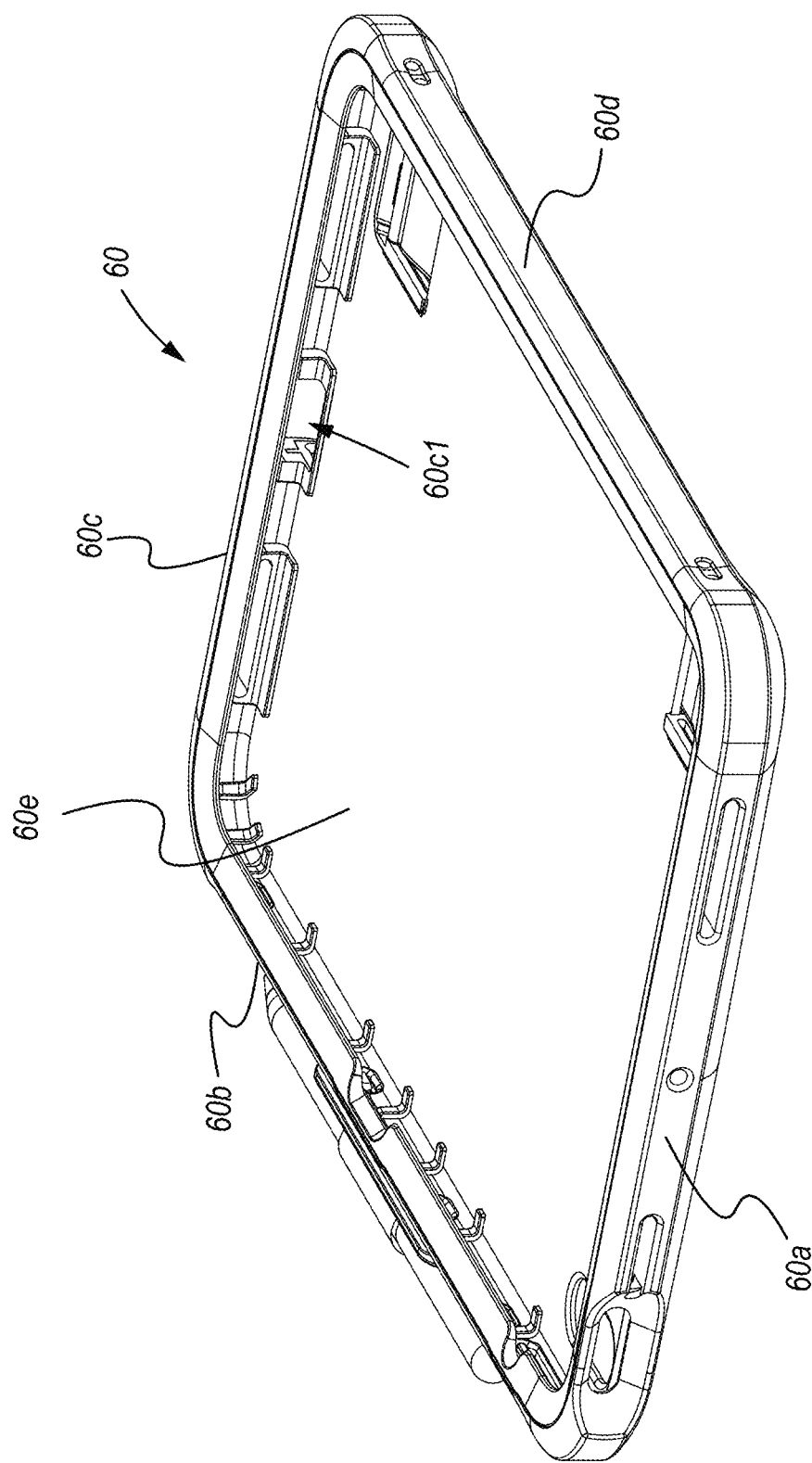
FIG. 20 is a rear perspective view of a portable electronic tablet case.

Turning to FIG. 20, depicted therein is a rear perspective view of portable electronic tablet case 60.

Figure 20A:
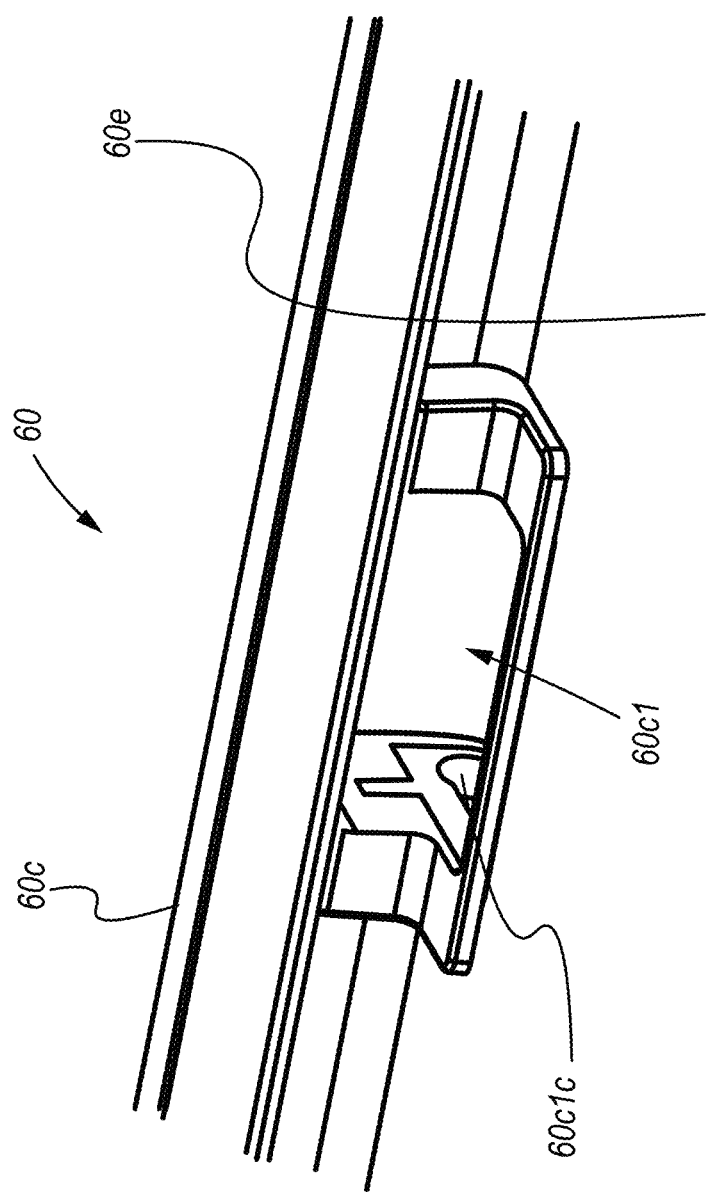
FIG. 20A is an enlarged rear perspective view of a portion of the portable electronic tablet case of FIG. 18.

Turning to FIG. 20A, depicted therein is an enlarged rear perspective view of a portion of portable electronic tablet case 60. Depicted implementation of docking bay 60*c*1 is shown to include elongated aperture 60*c*1*c*.

Figure 21:
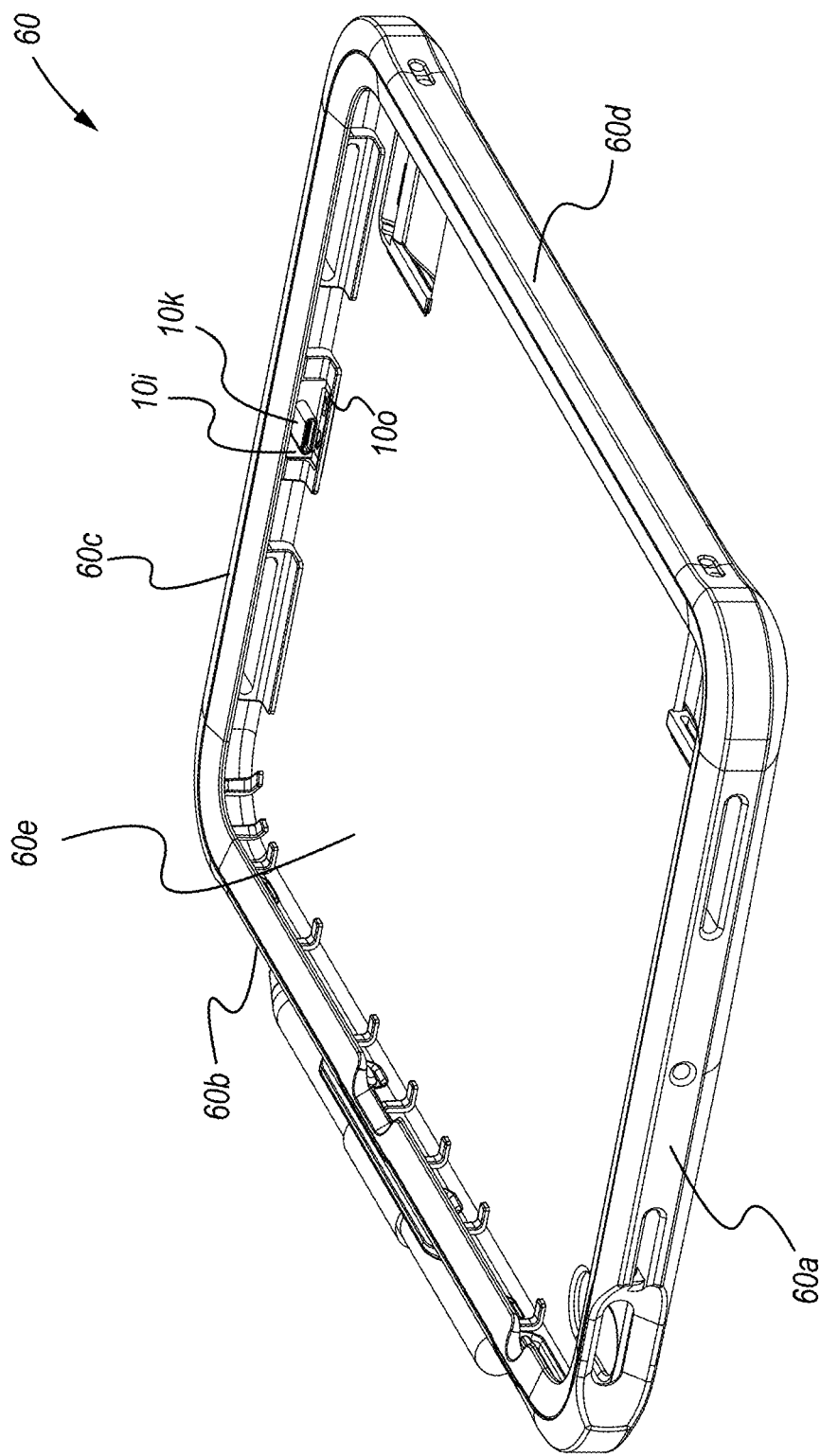
FIG. 21 is a rear perspective view of the electrical power coupler of FIG. 1 coupled with the portable electronic tablet case of FIG. 18.

Turning to FIG. 21, depicted therein is a rear perspective view of the electrical power coupler of FIG. 1 coupled with the portable electronic tablet case of FIG. 18.

Figure 22:
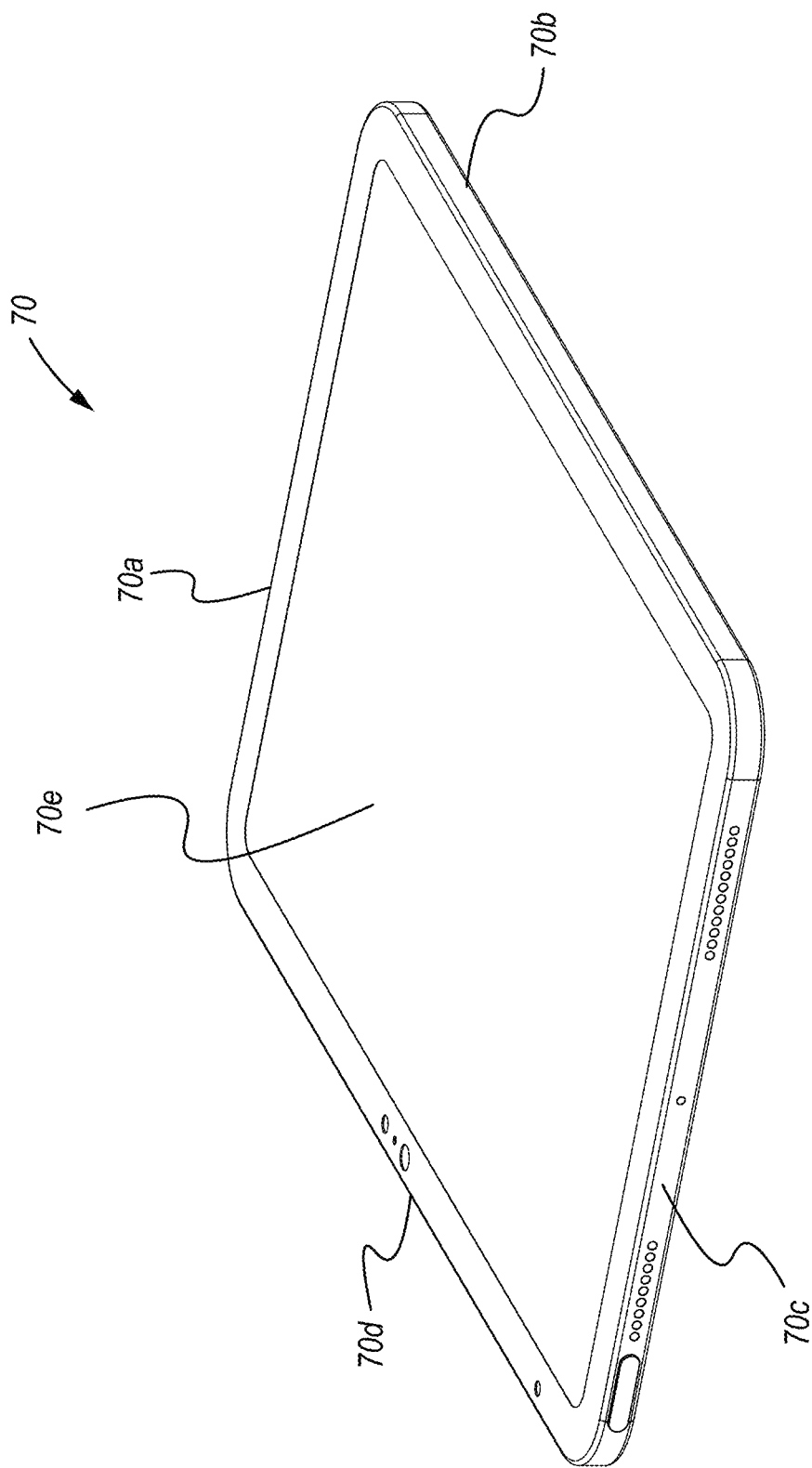
FIG. 22 is a rear perspective view of a portable electronic tablet.

Turning to FIG. 22, depicted therein is a rear perspective view of portable electronic tablet 70. Depicted implementation of portable electronic tablet 70 is shown to include side 70*a*, side 70*b*, side 70*c*, side 70*d*, and display 70*e*.

Figure 23:
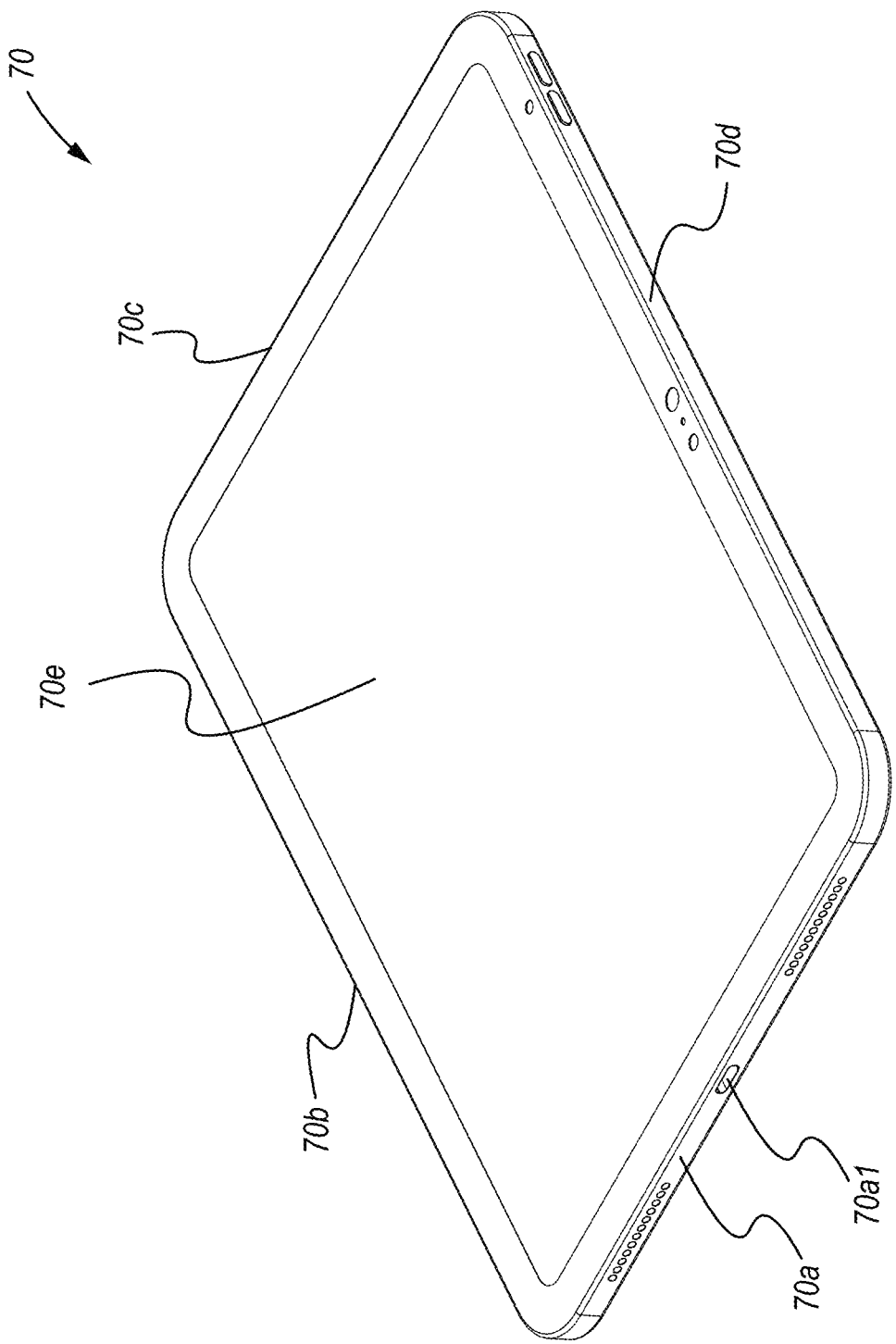
FIG. 23 is a front perspective view of the portable electronic tablet of FIG. 22.

Turning to FIG. 23, depicted therein is a front perspective view of portable electronic tablet 70. Depicted implementation of side 70*a* is shown to include electrical port 70*a*1.

Figure 24:
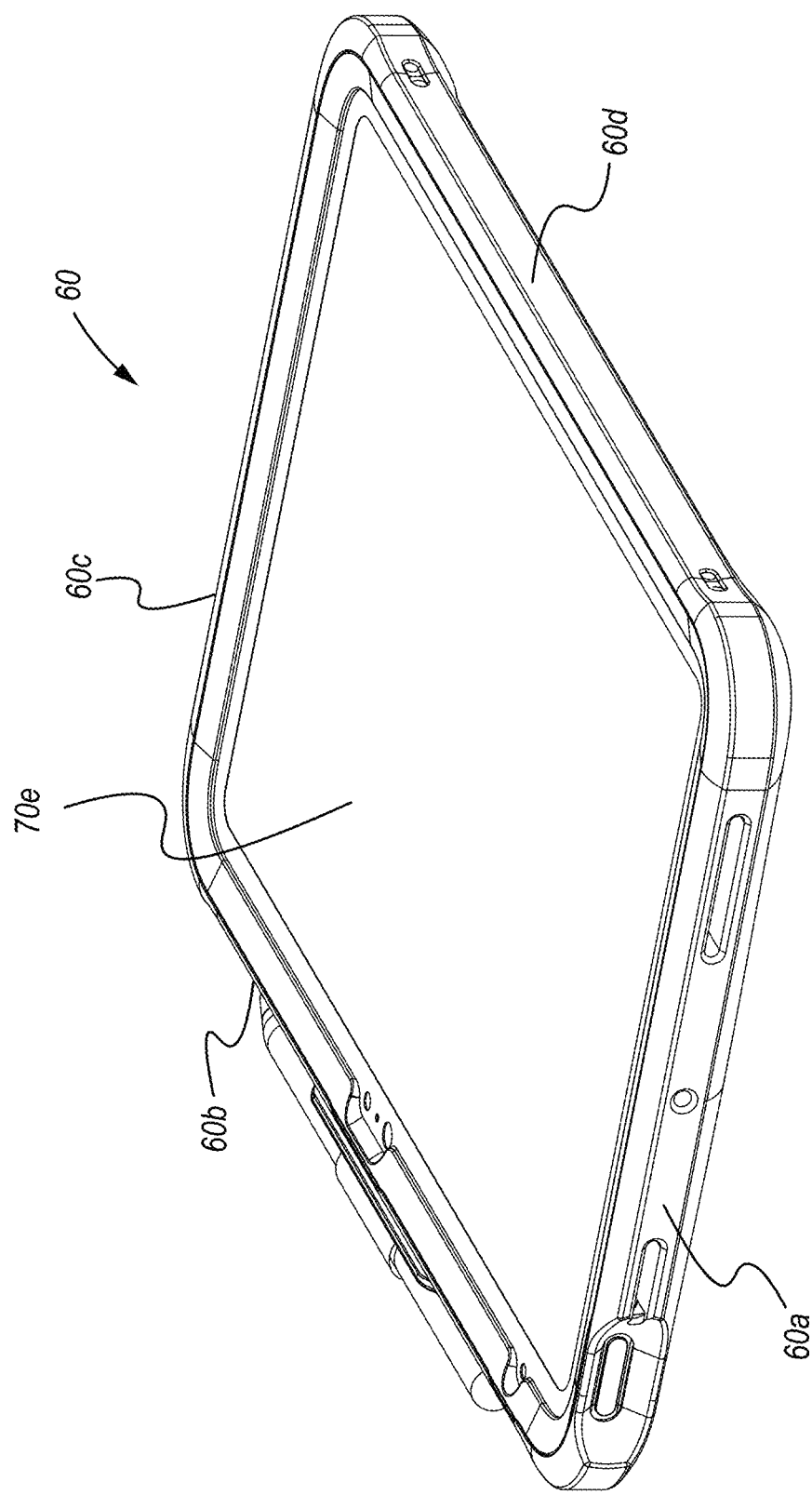
FIG. 24 is a rear perspective view of the portable electronic tablet of FIG. 22 coupled with the portable electronic tablet case of FIG. 18.

Turning to FIG. 24, depicted therein is a rear perspective view portable electronic tablet 70 coupled with portable electronic tablet case 60.

Figure 25:
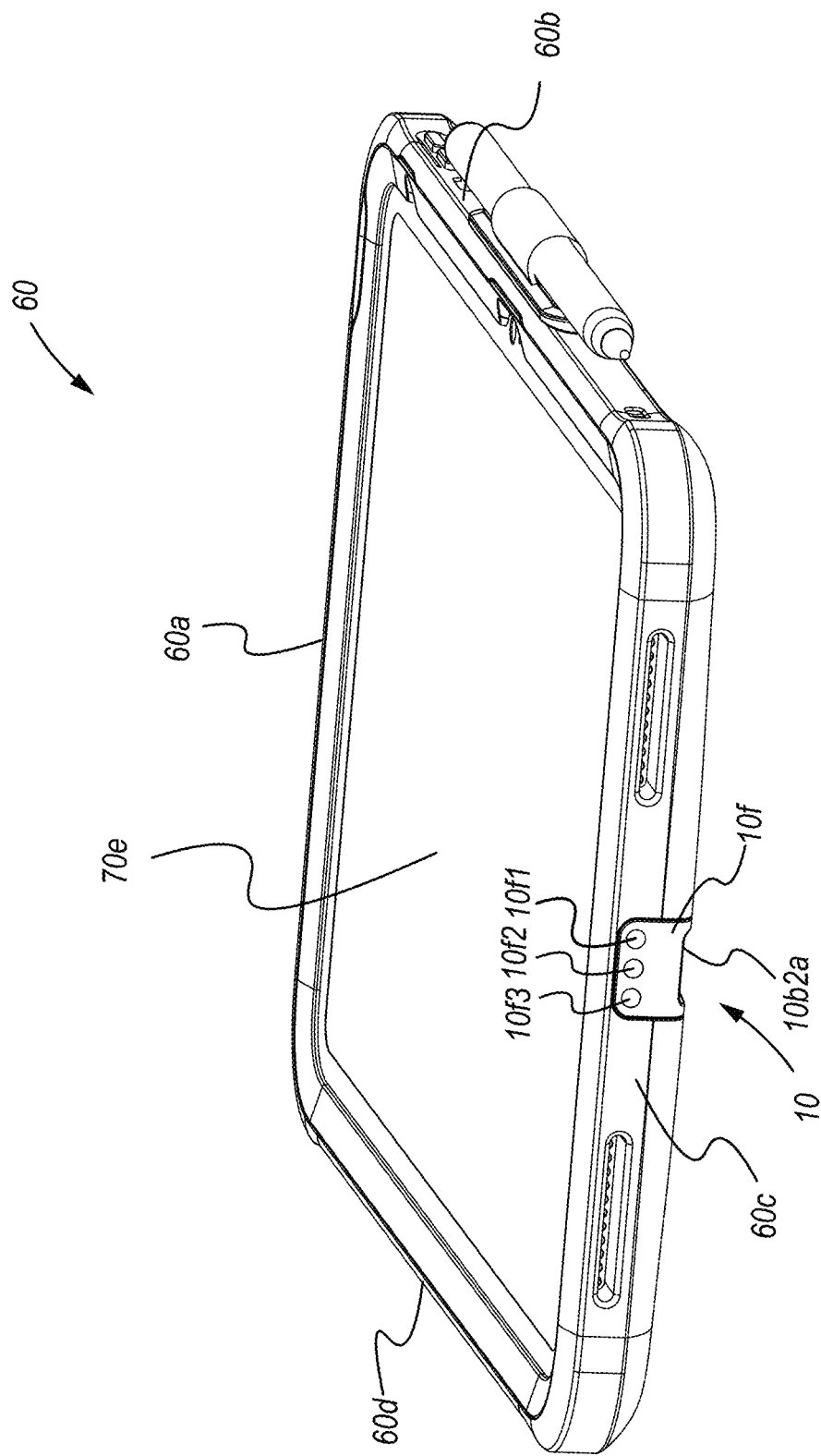
FIG. 25 is a front perspective view of the portable electronic tablet of FIG. 22 coupled with the portable electronic tablet case of FIG. 18.

Turning to FIG. 25, depicted therein is a front perspective view portable electronic tablet 70 coupled with portable electronic tablet case 60.

Figure 26:
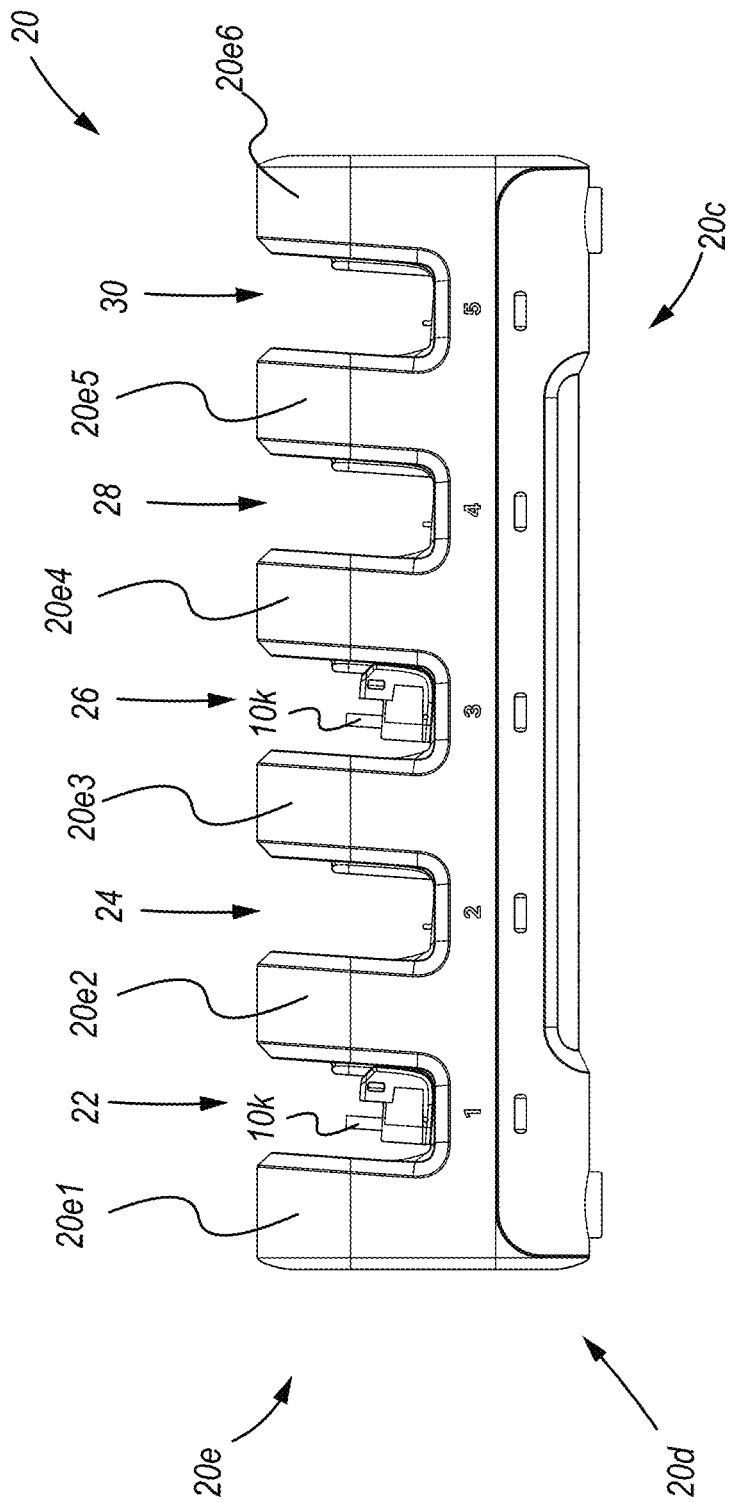
FIG. 26 is a side elevational view of a plurality of instances of the electrical power coupler of FIG. 1 coupled with a plurality of device bays of the multi-bay portable electronic device charger assembly of FIG. 7.

Turning to FIG. 26, depicted therein is a side elevational view of a plurality of instances of electrical power coupler 10 coupled with device bay 22 and device bay 26 of multi-bay portable electronic device charger assembly 20.

Figure 26A:
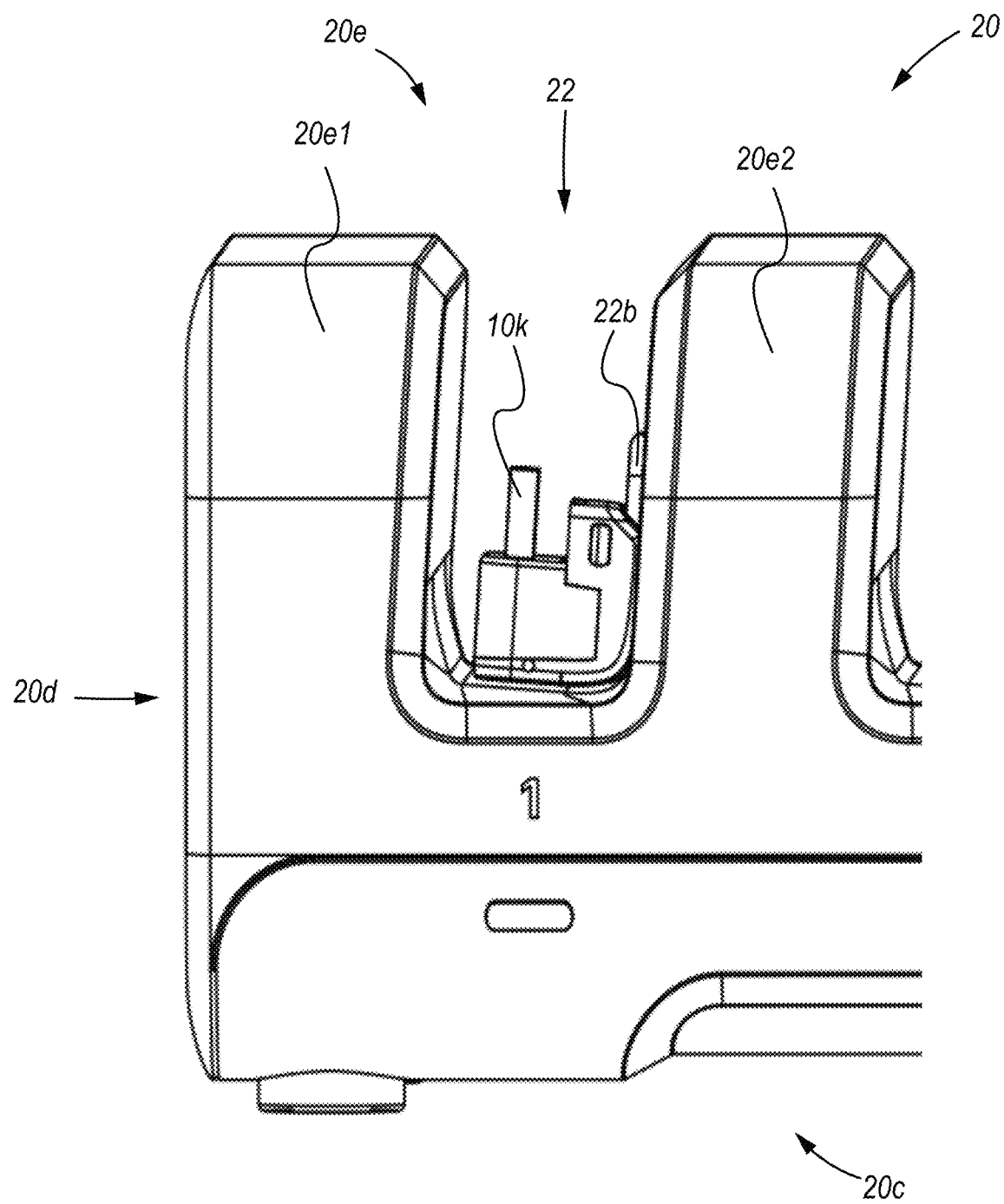
FIG. 26A is an enlarged side elevational view of the electrical power coupler of FIG. 1 coupled with a device bay portion of the multi-bay portable electronic device charger assembly of FIG. 7.

Turning to FIG. 26A, depicted therein is an enlarged side elevational view of electrical power coupler 10 coupled with device bay 22 of multi-bay portable electronic device charger assembly 20.

Figure 27:
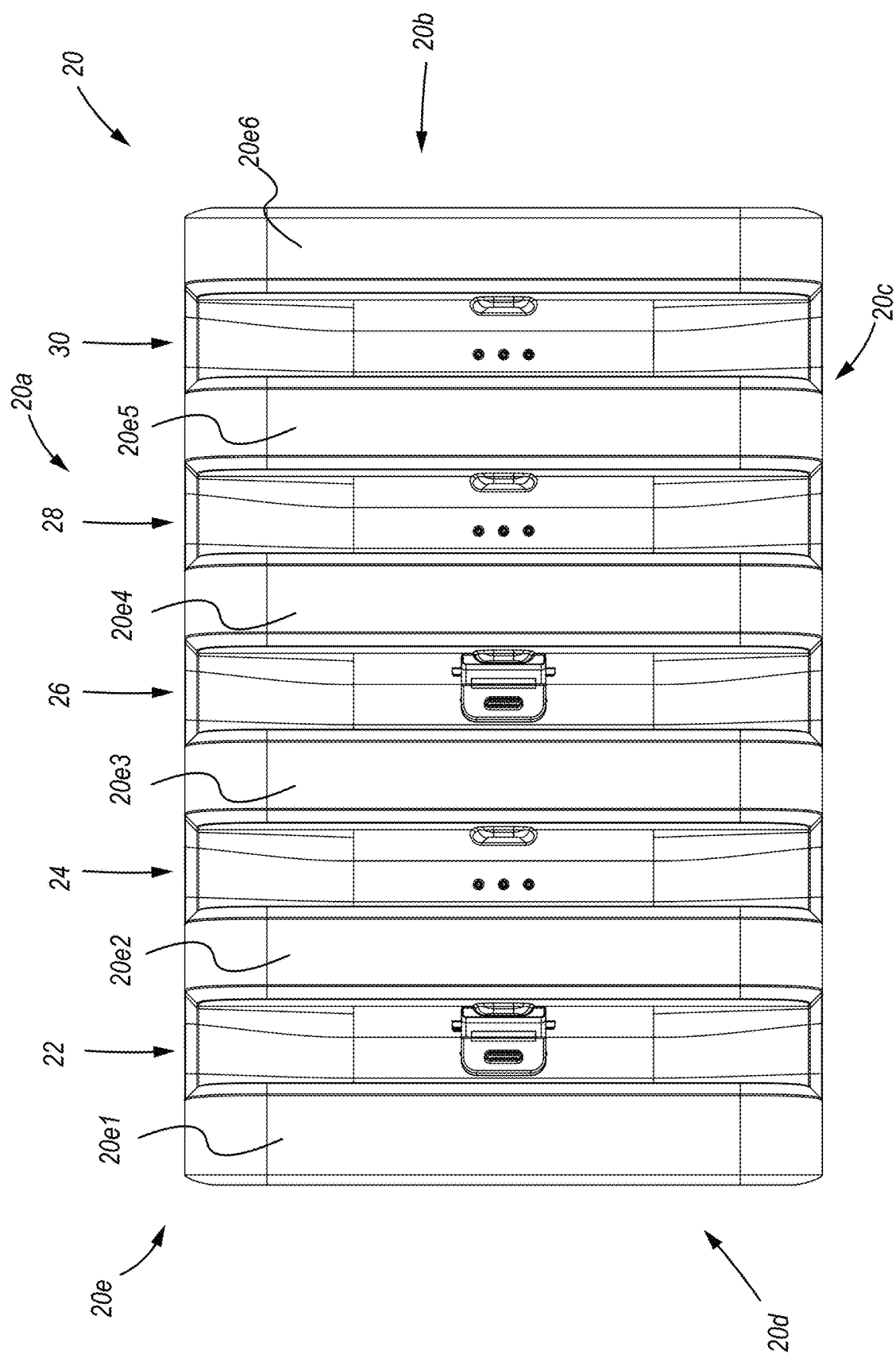
FIG. 27 is a top plan view of a plurality of instances of the electrical power coupler of FIG. 1 coupled with a plurality of device bays of the multi-bay portable electronic device charger assembly of FIG. 7.

Turning to FIG. 27, depicted therein is a top plan view of a plurality of instances of electrical power coupler 10 coupled with device bay 22 and device bay 26 of multi-bay portable electronic device charger assembly 20.

Figure 27A:
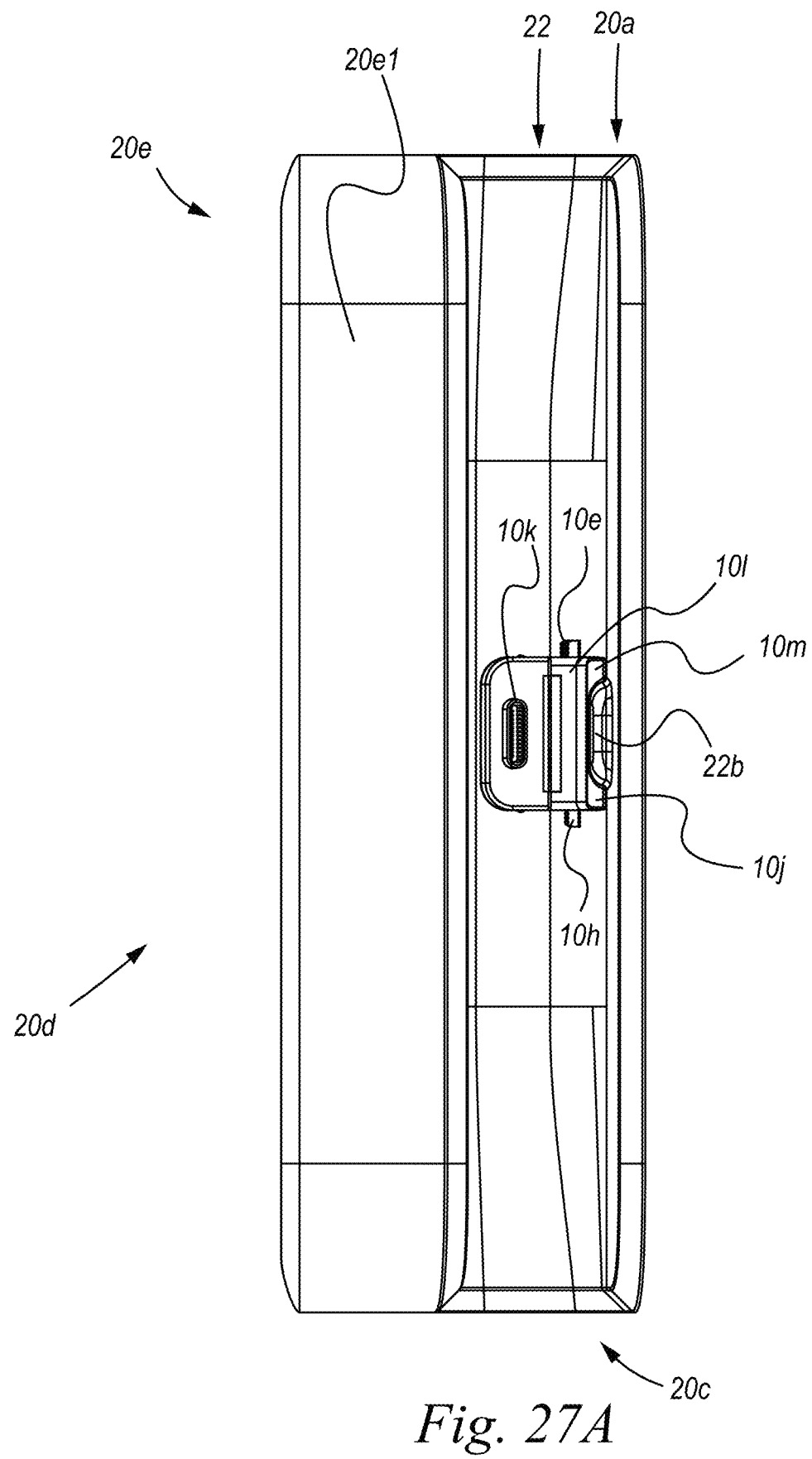
FIG. 27A is a top plan view of the electrical power coupler of FIG. 1 coupled with a device bay portion of the multi-bay portable electronic device charger assembly of FIG. 7.

Turning to FIG. 27A, depicted therein is an enlarged side top plan view of electrical power coupler 10 coupled with device bay 22 of multi-bay portable electronic device charger assembly 20.

Figure 28:
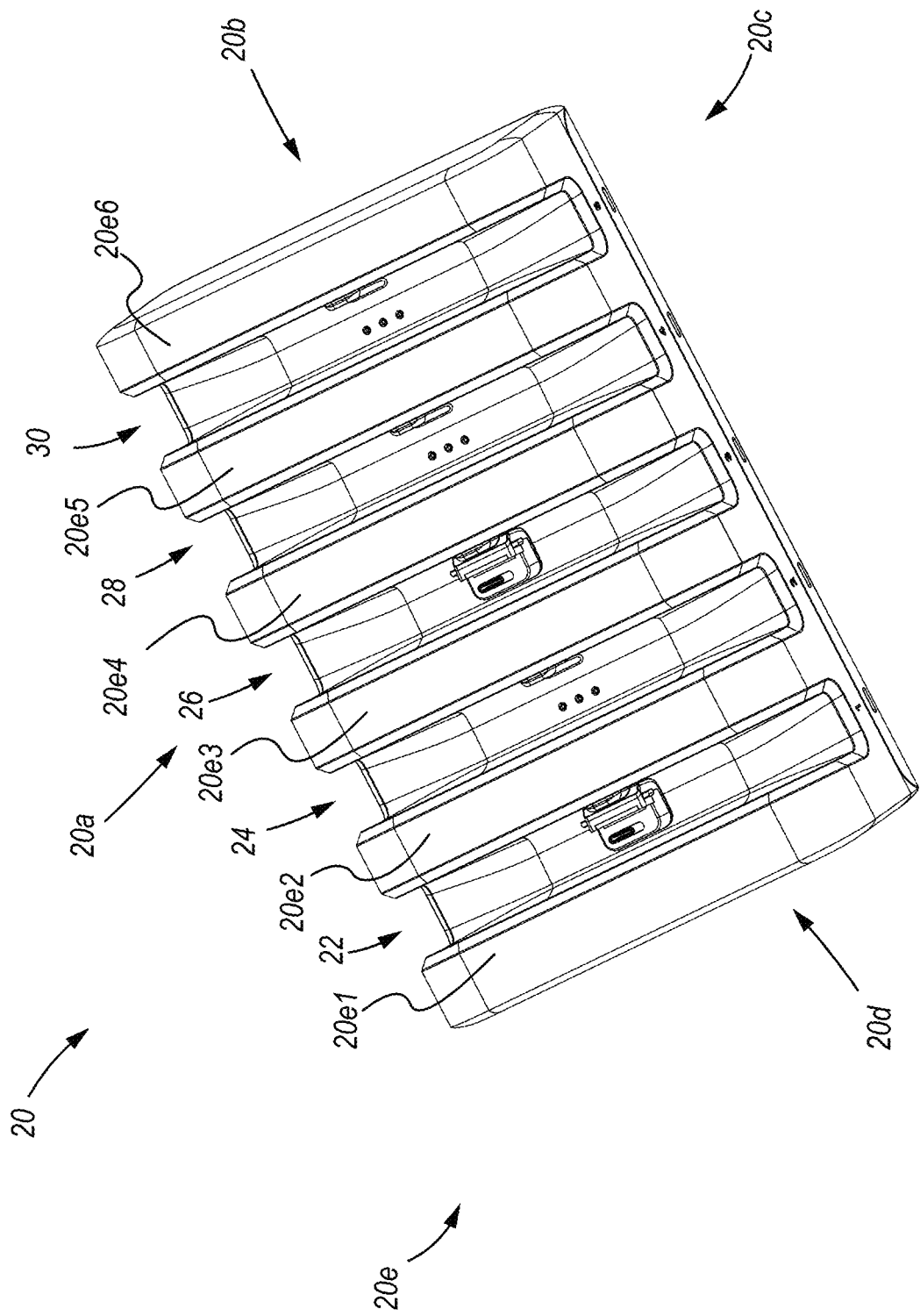
FIG. 28 is a front perspective view of a plurality of instances of the electrical power coupler of FIG. 1 coupled with a plurality of device bays of the multi-bay portable electronic device charger assembly of FIG. 7.

Turning to FIG. 28, depicted therein is a top plan view of a plurality of instances of electrical power coupler 10 coupled with device bay 22 and device bay 26 of multi-bay portable electronic device charger assembly 20.

Figure 28A:
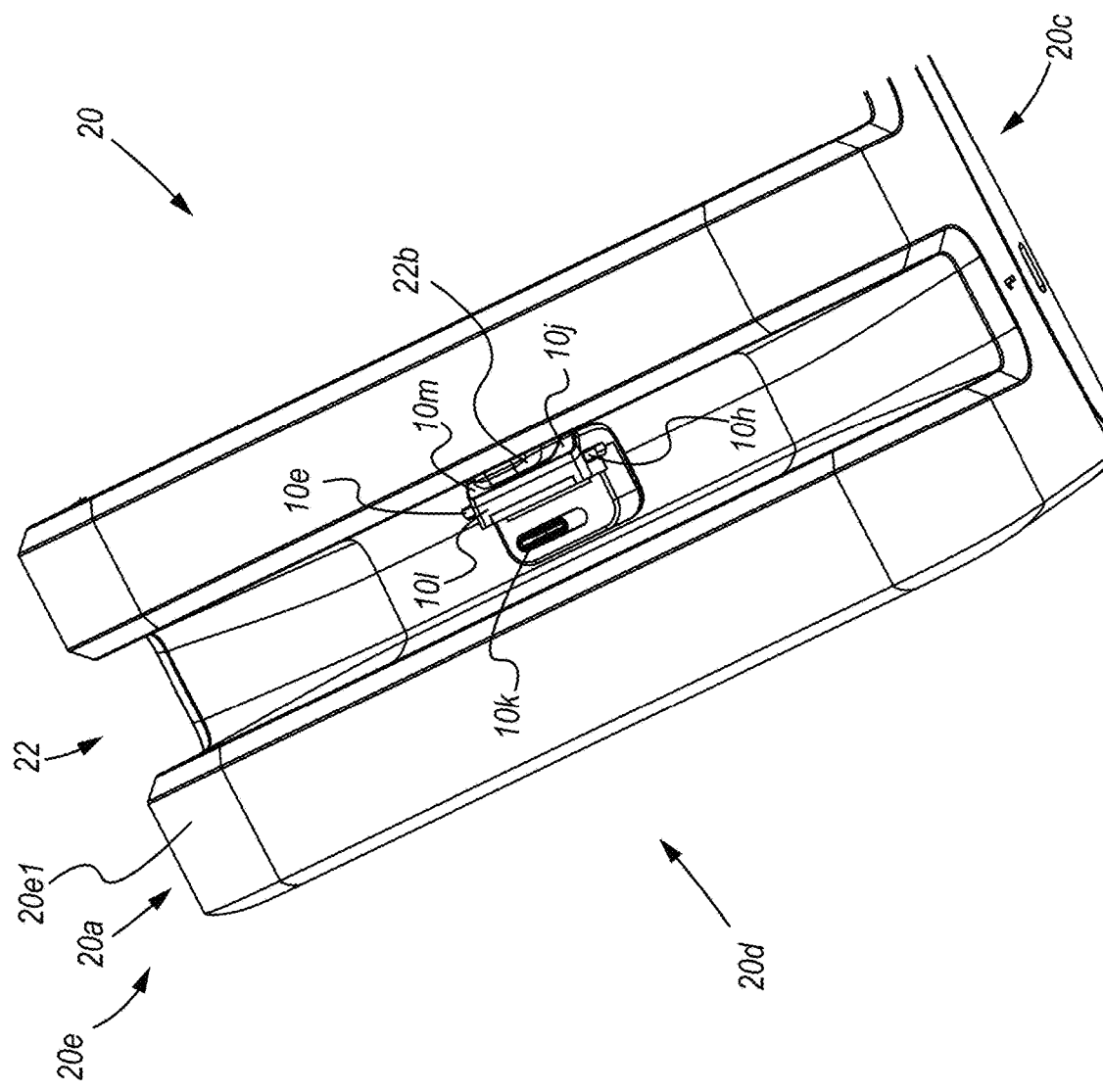
FIG. 28A is a front perspective view of the electrical power coupler of FIG. 1 coupled with a device bay portion of the multi-bay portable electronic device charger assembly of FIG. 7.

Turning to FIG. 28A, depicted therein is an enlarged side top plan view of electrical power coupler 10 coupled with device bay 22 of multi-bay portable electronic device charger assembly 20.

Figure 29:
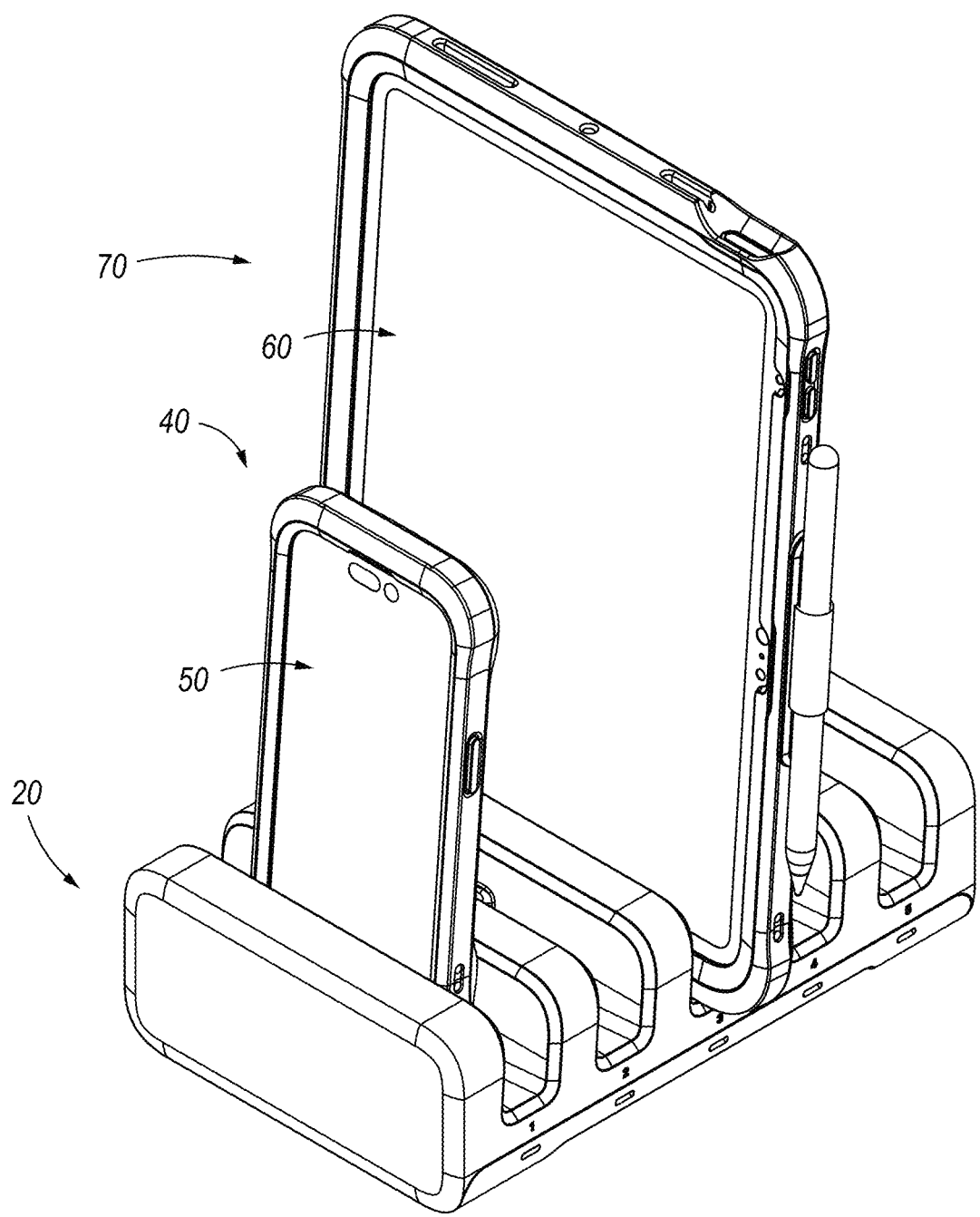
FIG. 29 is a front perspective view of the electrical power coupler of FIG. 1 coupled with the portable electronic phone case of FIG. 10 coupled with the portable electronic phone of FIG. 14 coupled with a device bay of the multi-bay portable electronic device charger assembly of FIG. 7 and a front perspective view of the electrical power coupler of FIG. 1 coupled with the portable electronic tablet case of FIG. 18 coupled with the portable electronic tablet of FIG. 22 coupled with a device bay of the multi-bay portable electronic device charger assembly of FIG. 7.

Turning to FIG. 29, depicted therein is a front perspective view of electrical power coupler 10 coupled with portable electronic phone case 40 coupled with portable electronic phone 50 coupled with device bay 22 of multi-bay portable electronic device charger assembly 20 and also depicted therein is a front perspective view of electrical power coupler 10 coupled with portable electronic tablet case 60 coupled with portable electronic tablet 70 coupled with device bay 26 of multi-bay portable electronic device charger assembly 20.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

With respect to the appended claims, those skilled in the art will appreciate that recited operations therein may generally be performed in any order. Also, although various operational flows are presented in a sequence(s), it should be understood that the various operations may be performed in other orders than those which are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

What is claimed is:

1. A portable electronic device charger system for charging a plurality of portable electronic devices including first portable electronic devices being of different sizes, the system comprising:
   (I) a portable electronic device charger assembly including
      (A) at least one device bay including
         (i) a floor including an electrical interface,
         (ii) a first wall extending from the floor, and
         (iii) a second wall extending from the floor, the second wall spaced across the floor from the first wall, and oppositely facing the first wall;
   (II) at least one portable electronic device case assembly including
      (A) a base,
      (B) a periphery having four sides extending from the base, and
      (C) a power docking bay positioned on a portion of one of the four sides; and
   (III) at least one electrical power coupler,
   wherein the at least one electrical power coupler is removably electrically couplable to the at least one portable electronic device, wherein the at least one electrical power coupler is removably electrically couplable to the interface of the floor of the at least one device bay of the portable electronic device charger, wherein the at least one electrical power coupler is removably couplable to the first wall of the at least one device bay of the portable electronic device charger, and wherein the at least one electrical power coupler is removably couplable to the at least one portable electronic device case assembly, wherein the first wall includes an elongated protrusion removably couplable with the electrical power coupler.

2. The system of claim 1,
wherein the electrical power coupler includes an engagement notch removable couplable with the elongated protrusion of the first wall.

3. The system of claim 1,
wherein the first wall has first and second edges, and
wherein the elongated protrusion is located midway between the first and second edges.

4. The system of claim 1,
wherein the elongated protrusion extends vertically,
wherein the elongated protrusion includes a tapered shape, and
wherein portions of the elongated protrusion closer to the floor are wider than portions of the elongated protrusion farther from the floor.

5. The system of claim 4,
wherein the electrical power coupler has an engagement notch shaped to removably couple with the tapered shape of the elongated protrusion.

6. The system of claim 1,
wherein the elongated protrusion is positioned in a central location on the first wall relative to the electrical interface on the floor.

7. A portable electronic device charger system for charging a plurality of portable electronic devices including first portable electronic devices being of different sizes, the system comprising:
(I) a portable electronic device charger assembly including
  (A) at least one device bay including
    (i) a floor including an electrical interface,
    (ii) a first wall extending from the floor, and
    (iii) a second wall extending from the floor, the second wall spaced across the floor from the first wall, and oppositely facing the first wall:
(II) at least one portable electronic device case assembly including
  (A) a base,
  (B) a periphery having four sides extending from the base, and
  (C) a power docking bay positioned on a portion of one of the four sides; and
(III) at least one electrical power coupler,
wherein the at least one electrical power coupler is removably electrically couplable to the at least one portable electronic device,
wherein the at least one electrical power coupler is removably electrically couplable to the interface of the floor of the at least one device bay of the portable electronic device charger,
wherein the at least one electrical power coupler is removably couplable to the first wall of the at least one device bay of the portable electronic device charger, and
wherein the at least one electrical power coupler is removably couplable to the at least one portable electronic device case assembly,
wherein a first of the sides of the at least one portable electronic device case includes an aperture,
wherein the electrical power coupler includes a coupler plug including specifications for portable electronic device coupling, and
wherein the coupler plug at least partially extends through the aperture when the electrical power coupler is coupled with the at least one portable electronic device case,
wherein the aperture of the first side includes first and second elongated side wall apertures,
wherein the electrical power coupler includes first and second engagement pins, and
wherein the first and second engagement pins are coupled with the first and second elongated side wall apertures when the electrical power coupler is coupled with the at least one portable electronic device case.

8. The system of claim 7,
wherein the first and second engagement pins are rectangular in shape.

* * * * *